(12) United States Patent
Yamagishi

(10) Patent No.: US 8,576,337 B2
(45) Date of Patent: Nov. 5, 2013

(54) VIDEO IMAGE PROCESSING APPARATUS AND VIDEO IMAGE PROCESSING METHOD

(75) Inventor: Masaharu Yamagishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/414,308

(22) Filed: Mar. 7, 2012

(65) Prior Publication Data

US 2012/0242896 A1    Sep. 27, 2012

(30) Foreign Application Priority Data

Mar. 24, 2011  (JP) ................................ 2011-066216
Jan. 24, 2012  (JP) ................................ 2012-012004

(51) Int. Cl.
*H04N 7/01* (2006.01)
*H04N 11/20* (2006.01)

(52) U.S. Cl.
USPC .......................................... 348/448; 348/452

(58) Field of Classification Search
USPC .................... 348/448–452; 382/266
See application file for complete search history.

(56) References Cited

U.S. PATENT DOCUMENTS

2009/0214132 A1* 8/2009 Yamada et al. ............... 382/266

FOREIGN PATENT DOCUMENTS

| JP | 11-041565 A | 2/1999 |
|---|---|---|
| JP | 2005-303999 | 10/2005 |
| JP | 2005-303999 A | 10/2005 |
| JP | 2005-341346 | 12/2005 |

OTHER PUBLICATIONS

The above references were cited in a May 7, 2013 Japanese Office Action, which is enclosed without an English Translation, that issued in Japanese Patent Application No. 2012-012004.

* cited by examiner

*Primary Examiner* — Michael Lee
(74) *Attorney, Agent, or Firm* — Cowan, Liebowitz & Latman, P.C.

(57) ABSTRACT

A video image processing apparatus has a determination unit that determines whether an interpolation pixel generation position is an edge portion in an oblique direction, and determines a direction of the edge; and a generation unit that generates an interpolation pixel at an interpolation pixel generation position at which there is video image motion and which has been determined, by the determination unit, to be an edge portion in an oblique direction, in use of a pixel that is present in the edge direction, wherein the determination unit determines whether the interpolation pixel generation position is an edge portion in an oblique direction on the basis of whether or not a pixel value one line above or one line below the interpolation pixel generation position increases or decreases locally at positions that are adjacent, in a vertical direction, to the interpolation pixel generation position.

16 Claims, 17 Drawing Sheets

VIDEO IMAGE PROCESSING APPARATUS AND VIDEO IMAGE PROCESSING METHOD

BACKGROUND OF THE INVENTION

1. Field of the Invention

The present invention relates to a video image processing apparatus and a video image processing method.

2. Description of the Related Art

Motion-adaptive IP (interlaced-to-progressive) conversion is a method for converting interlaced video image signals to progressive video image signals, by interpolation. In such a method, video image motion (motion information) is detected at an interpolation pixel generation position, and in accordance with motion information, there is adaptively switched between generation of an intra-field interpolation pixel, and an inter-field interpolation pixel, as interpolation pixels.

In motion-adaptive IP conversion, an interpolation pixel is generated at a position determined to "have motion", by using pixels that are adjacent, in a vertical direction, to that position, within one same field. As a result, raggedness known as "jaggies" occurs at edge portions in an oblique direction (oblique edge portions), which significantly impairs video image quality (image quality).

Methods proposed as techniques for suppressing the occurrence of jaggies involve detecting an oblique edge portion, on the basis of pixel information of an inputted interlaced video image signal, and generating an interpolation pixel for the oblique edge portion, using pixels in accordance with the inclination angle (edge direction) of the oblique edge portion.

For instance, a method has been proposed wherein, upon generation of an interpolation pixel that is positioned between a determination block and a reference block that resembles the determination block, the interpolation pixel is generated using at least any one pixel from among pixels in the determination block and the reference block (Japanese Patent Application Publication No. 2005-303999).

In the abovementioned method, however, image quality is significantly impaired if the inclination angle is misdetected.

Methods for determining the certainty of the inclination angle have been proposed (for instance, Japanese Patent Application Publication No. 2005-341346), that involve discriminating complexity in a horizontal direction of each line on the basis of images at lines that are adjacent, in a vertical direction, to an interpolation pixel generation position, and determining whether the interpolation pixel generation position is a position at which interpolation is to be performed for an oblique direction.

In the above-described conventional technologies, however, misdetection of oblique edge portions occurs, depending on the content of the input image, upon detection of the oblique edge portions on the basis of interlaced video image signals. For instance, a periodic pattern portion in the horizontal direction is likely to be misdetected as an thin line portion having a shallow inclination angle, or as separate thin oblique line portion (i.e. oblique edge portion), and vice-versa.

SUMMARY OF THE INVENTION

The present invention provides a technology that allows suppressing degradation of image quality upon conversion of an interlaced video image signal to a progressive video image signal, by a simple configuration.

A video image processing apparatus, according to the present invention, that converts an interlaced video image signal to a progressive video image signal, by interpolation, the video image processing apparatus comprises:

a determination unit that determines whether an interpolation pixel generation position is an edge portion in an oblique direction, and when the interpolation pixel generation position is an edge portion in an oblique direction, determines a direction of the edge; and a generation unit that generates an interpolation pixel by interlaced-to-progressive conversion, this generation unit being unit that generates an interpolation pixel at an interpolation pixel generation position at which there is video image motion and which has been determined, by the determination unit, to be an edge portion in an oblique direction, in use of a pixel that is present in the edge direction, wherein the determination unit determines whether the interpolation pixel generation position is an edge portion in an oblique direction on the basis of whether or not a pixel value one line above or one line below the interpolation pixel generation position increases or decreases locally at a position that is adjacent, in a vertical direction, to the interpolation pixel generation position.

A video image processing method, according to the present invention, that is carried out in a video image processing apparatus that converts an interlaced video image signal to a progressive video image signal by interpolation, the video image processing method comprises:

a determination step of determining whether an interpolation pixel generation position is an edge portion in an oblique direction, and determining the edge direction when the interpolation pixel generation position is an edge portion in an oblique direction; and a generation step of generating an interpolation pixel by motion-adaptive interlaced-to-progressive conversion, this generation step being a step of generating an interpolation pixel at an interpolation pixel generation position at which there is video image motion and which has been determined, in the determination step, to be an edge portion in an oblique direction, in use of a pixel that is present in the edge direction, wherein in the determination step determination is made on whether the interpolation pixel generation position is an edge portion in an oblique direction on the basis of whether or not a pixel value one line above or one line below the interpolation pixel generation position increases or decreases locally at positions that are adjacent, in a vertical direction, to the interpolation pixel generation position.

The present invention allows suppressing degradation of image quality upon conversion of an interlaced video image signal to a progressive video image signal, by a simple configuration.

Further features of the present invention will become apparent from the following description of exemplary embodiments with reference to the attached drawings.

DESCRIPTION OF THE EMBODIMENTS

Embodiment 1

A video image processing apparatus according to Embodiment 1 of the present invention, and a video image processing method that is carried out using the video image processing apparatus, are explained next with reference to accompanying drawings. The video image processing apparatus according to the present embodiment converts an interlaced video image signal into a progressive video image signal, by interpolation.

Figure 1:
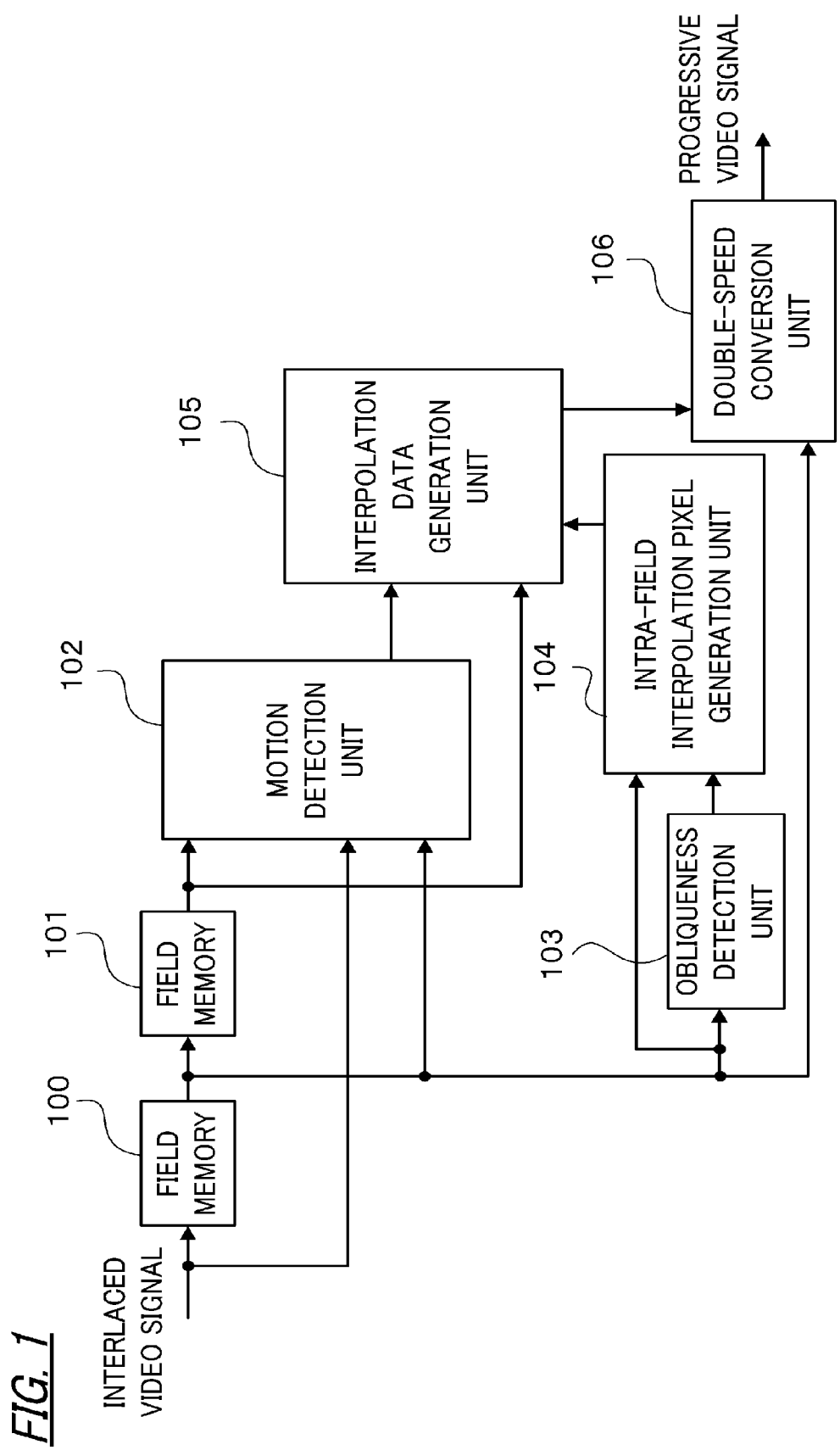
FIG. 1 is a diagram illustrating an example of the configuration of a video image processing apparatus according to Embodiment 1.

FIG. 1 is a block diagram illustrating the configuration of a video image processing apparatus according to the present embodiment.

In FIG. 1, field memories 100, 101 store, in field units, an interlaced video image signal that is inputted to the apparatus, and output the interlaced video image signal delayed by one field. Specifically, upon input into the video image processing apparatus of a signal that represents an image of an N-th field (N field), the field memory 100 outputs a signal that represents an image of an (N−1)-th field (N−1 field), and the field memory 101 outputs a signal that represents an image of an (N−2)-th field (N−2 field). In the present embodiment, an interpolation pixel is generated for the output signal of the field memory 100 (signal that represents an image of an N−1 field).

A motion detection unit 102 detects motion of a video image at the interpolation pixel generation position. Specifically, the motion detection unit 102 detects motion (motion information) of a video image at the interpolation pixel generation position by using signals of three fields, namely the signal inputted to the apparatus, the output signal from the field memory 100, and the output signal from the field memory 101. The detection result is outputted, as motion information, to an interpolation data generation unit 105. In the present embodiment, "1 (motion)" is outputted as the motion information of the interpolation pixel, if it is determined that there is video image motion, while "0 (still)" is outputted if it is determined that there is no video image motion. The motion detection method that is used may be a conventional method such as block matching, or a method wherein motion is decided on the basis of differences in the pixel values between two fields that are spaced apart from each other by 2 fields.

An obliqueness detection unit 103 determines whether the interpolation pixel generation position is an edge portion in an oblique direction (oblique edge portion). If the interpolation pixel generation position is an edge portion in an oblique direction, the obliqueness detection unit 103 determines the direction of that edge, and outputs information representing the edge direction to an intra-field interpolation pixel generation unit 104. In the present embodiment, angle information that represents the inclination angle of the edge with respect to the vertical direction is outputted as the information that represents an edge direction. The obliqueness detection unit 103 in the present embodiment corresponds to the determination unit of the present invention.

The intra-field interpolation pixel generation unit 104 generates, and outputs, an interpolation pixel (intra-field interpolation pixel), by intra-field interpolation, on the basis of angle information outputted by the obliqueness detection unit 103. The intra-field interpolation pixel is an interpolation pixel that is appropriate for being generated at a position at which there is video image motion, and is an interpolation pixel that is generated using a pixel in an image of the field (N−1 field) for which the interpolation pixel is to be generated. In the present embodiment, the intra-field interpolation pixel generation unit 104 generates the interpolation pixel using a pixel that is present at the edge direction, for the interpolation pixel generation position that has been determined to be an edge portion in an oblique direction by the obliqueness detection unit 103.

Figure 2:
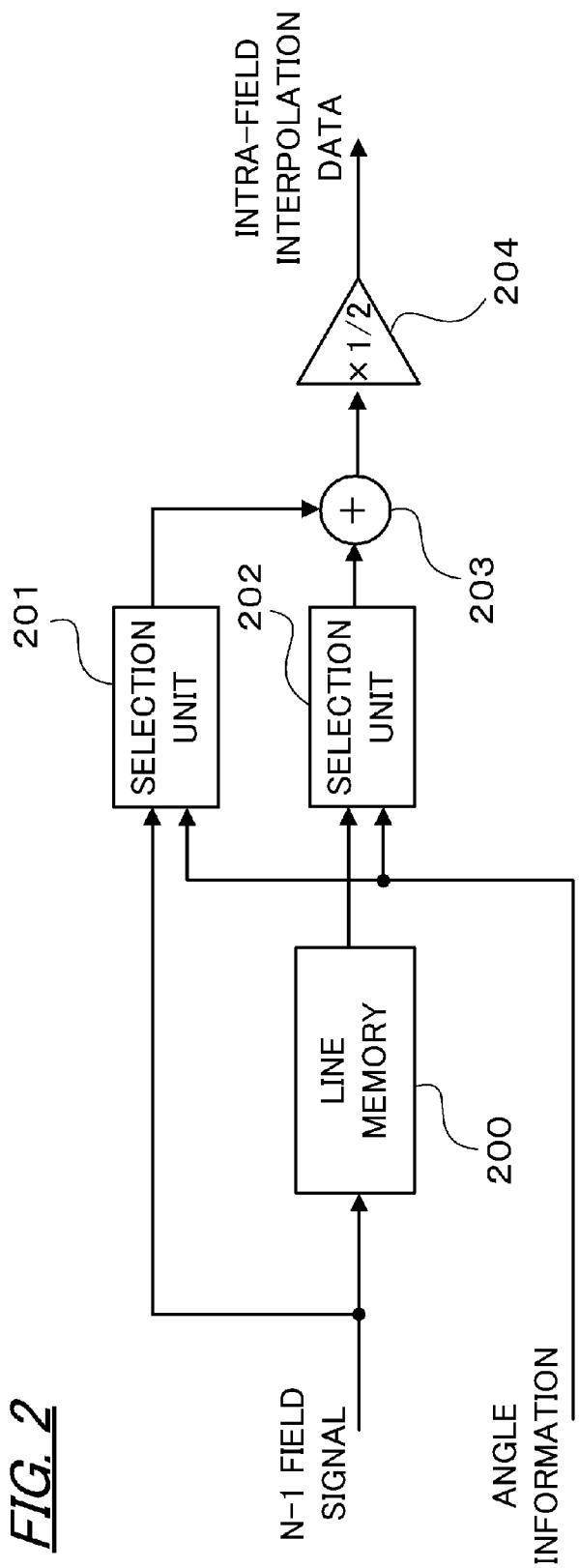
FIG. 2 is a diagram illustrating an example of the configuration of an intra-field interpolation pixel generation unit.

The intra-field interpolation pixel generation unit 104 has for instance a configuration such as the one illustrated in FIG. 2.

Herein, an N−1 field signal that is inputted to the intra-field interpolation pixel generation unit 104 is inputted to a line memory 200 and a selection unit A 201.

The line memory 200 delays the inputted signal by 1H (1 horizontal), and the result is outputted to a selection unit B 202.

For each interpolation pixel generation position, the selection unit A 201 selects a pixel according to angle information outputted by the obliqueness detection unit 103 from the inputted N−1 field signal (signal representing an image at one line below the interpolation pixel generation position).

For each interpolation pixel generation position, the selection unit B 202 selects a pixel according to angle information outputted by the obliqueness detection unit 103 from a signal outputted by the line memory 200 (signal representing an image at one line above the interpolation pixel generation position).

The pixel selection method in the selection unit A 201 and the selection unit B 202 will be explained based on FIG. 3.

Figure 3:
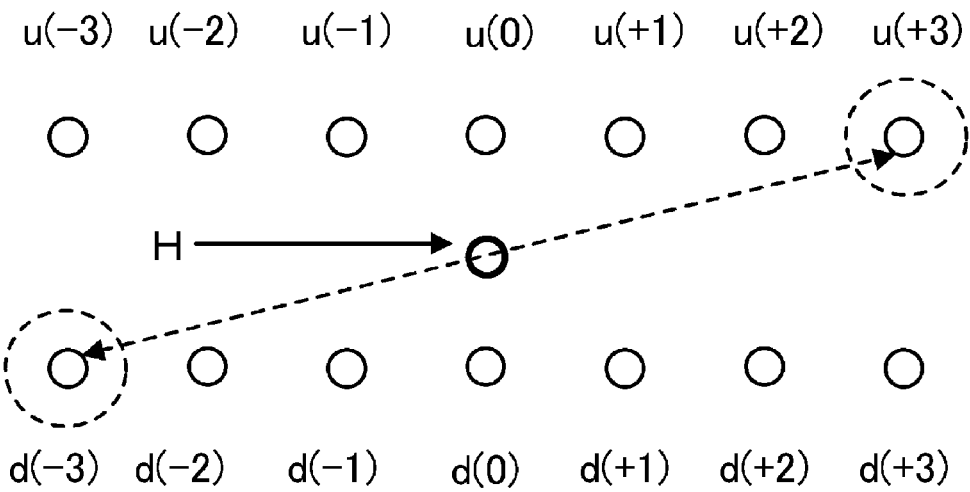
FIG. 3 is a diagram illustrating an example of a pixel selection method in accordance with angle information.

In FIG. 3, pixels u(x) denote pixels on a line of the output signal of the line memory 200 (one line above the interpolation pixel generation position). In the pixels u(x), x is the offset of the position of the pixels u(x) in a horizontal direction with respect to the interpolation pixel generation position (i.e. is a value denoting the position of the pixels u(x) in a horizontal direction, with reference to the interpolation pixel generation position). Specifically, a value of −3 for x indicates that the position of the pixel in the horizontal direction is a position removed by three pixels to the left, with respect to the interpolation pixel generation position. A value of +3 for x indicates that the position of the pixel in the horizontal direction is a position removed by three pixels to the right, with respect to the interpolation pixel generation position.

The pixels d(x) are pixels on a line of the input signal of the intra-field interpolation pixel generation unit 104 (one line below the interpolation pixel generation position). The meaning of x in the pixels d(x) is as described above.

In the present embodiment, the obliqueness detection unit 103 outputs the value of the above-described x, as angle information. The obliqueness detection unit 103 outputs 0 when the interpolation pixel generation position is not an oblique edge portion.

Figure 4:
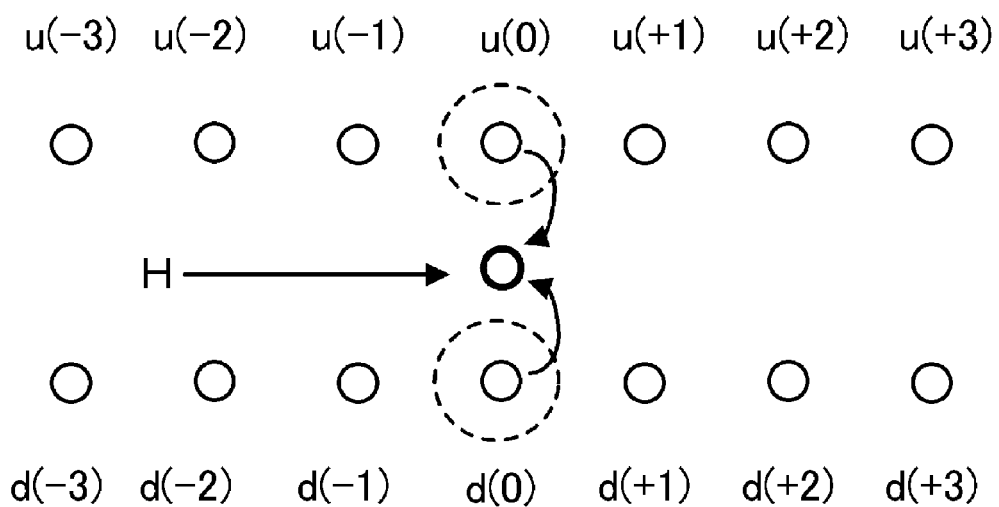
FIG. 4 is a diagram illustrating an example of a pixel selection method in accordance with angle information.

If the angle information is +A (A is a natural number), u(+A) is selected by the selection unit A 201, and d(−A) is selected by the selection unit B 202. If the angle information is −B (B is a natural number), u(−B) is selected by the selection unit A 201, and d(+B) is selected by the selection unit B 202. In the example of FIG. 3, u(+3) is selected by the selection unit A 201 and d(−3) is selected by the selection unit B 202 if the angle information with respect to the interpolation pixel generation position H is +3. As illustrated in FIG. 4, u(0) is selected by the selection unit A 201, and d(0) is selected by the selection unit B 202, if the output from the obliqueness detection unit 103 is 0.

An adder 203 adds the value of the pixel selected by the selection unit A 201 and the value of the pixel selected by the selection unit B 202, and outputs the result to a multiplier 204.

The multiplier 204 multiplies the inputted value by ½, and outputs the result as the value of an intra-field interpolation pixel (intra-field interpolation data).

For the N−1 field image, thus, there is obtained as a result a mean value of pixel values of two pixels that are adjacent in the oblique edge direction, as the pixel value of the interpolation pixel in the oblique edge portion. A mean value of the pixel values of two pixels that are adjacent in the vertical direction can be obtained as a pixel value of an interpolation pixel at a position other than the oblique edge portion.

For each interpolation pixel generation position, the interpolation data generation unit 105 switches between interpolation methods in accordance with the detection result of the motion detection unit 102, and generates an interpolation pixel. Herein, interpolation pixels are generated (a generation unit) by motion-adaptive interlaced-to-progressive conversion. If there is no video image motion at the interpolation pixel generation position (motion information is "0"), specifically, there is generated, at the generation position, an interpolation pixel (interpolation pixel by inter-field interpolation: inter-field interpolation pixel) that has a pixel value outputted by the field memory 101. If there is video image motion (motion information is "1"), there is generated, at the generation position, an interpolation pixel (intra-field interpolation pixel) having a pixel value as outputted by the intra-field interpolation pixel generation unit 104. Specifically, there is generated an interpolation pixel using a pixel that is present at an edge direction, at an interpolation pixel generation position at which there is video image motion and that has been determined, by the obliqueness detection unit 103, to be an edge portion in an oblique direction. Interpolation data comprising a plurality of the generated interpolation pixels is outputted to a below-described double-speed conversion unit 106. The inter-field interpolation pixel is an interpolation pixel that is appropriate for generation at a position at which there is no video image motion, and is an interpolation pixel having a pixel value identical to that of a pixel in an N−2 field image (pixel at a position identical to the interpolation pixel generation position).

The double-speed conversion unit 106 outputs, as a progressive video image signal (signal of one frame of a progressive video image), a progressive video image signal that results from combining interpolation data outputted by the interpolation data generation unit 105 and an N−1 field signal outputted by the field memory 100.

Specifically, the double-speed conversion unit 106 reads a signal of a field (N−1 field) outputted by the field memory 100, and interpolation data outputted by the interpolation data generation unit 105, at a speed that is twice the speed with which the interlaced video image signal is inputted. As a result there is outputted a progressive video image signal such that a pixel that makes up the N−1 field image, and the interpolation pixel, are repeated for each one line.

Figure 5:
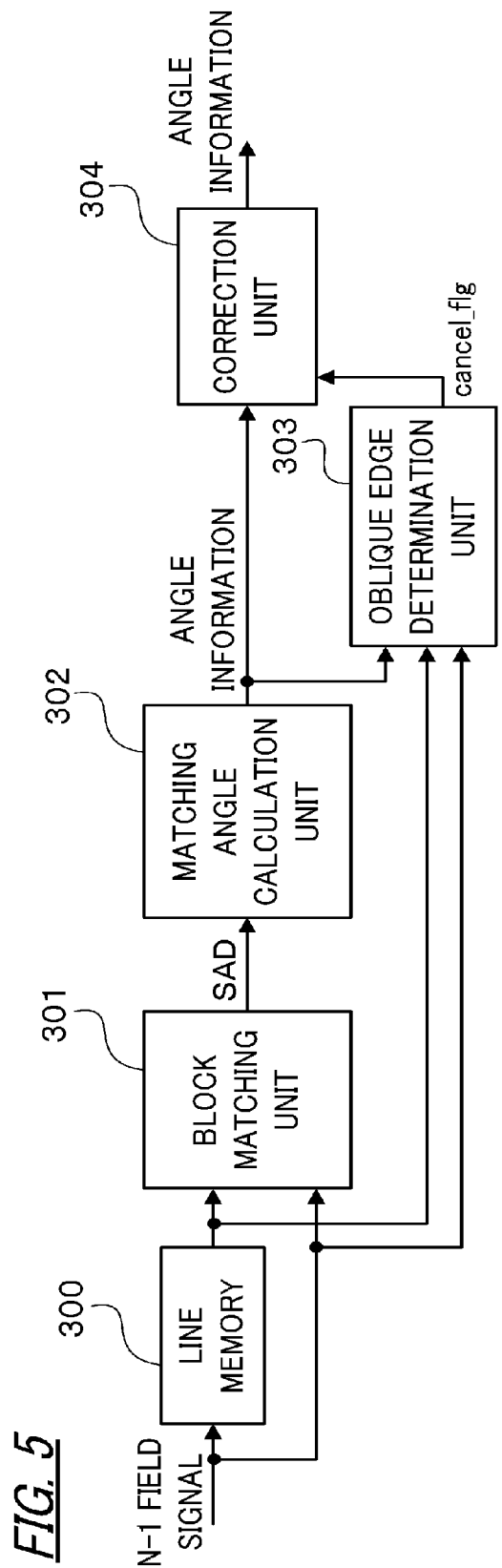
FIG. 5 is a diagram illustrating an example of the configuration of an obliqueness detection unit according to Embodiment 1.

The configuration of the obliqueness detection unit 103 is explained next. FIG. 5 is a block diagram illustrating an example of the configuration of the obliqueness detection unit 103 according to the present embodiment. As illustrated in FIG. 5, the obliqueness detection unit 103 according to the present embodiment has, for instance, a line memory 300, a block matching unit 301, a matching angle calculation unit 302, an oblique edge determination unit 303 and a correction unit 304. The obliqueness detection unit 103 selects an optimal interpolation direction for the interpolation pixel generation position.

The line memory 300 delays the inputted signal (N−1 field signal) by 1H (1 horizontal scan period), and outputs the result.

The block matching unit 301 performs block matching that utilizes a signal (N−1 field signal) inputted to the obliqueness detection unit 103 and a signal (1H-delayed N−1 field signal) that is outputted by the line memory 300, and calculates a SAD value (sum of absolute differences). Block matching is a method of detecting a region that corresponds to a region of one image, through comparison of pixel values in a block between two images, wherein one block is made up of a predefined number of pixels.

Figure 6:
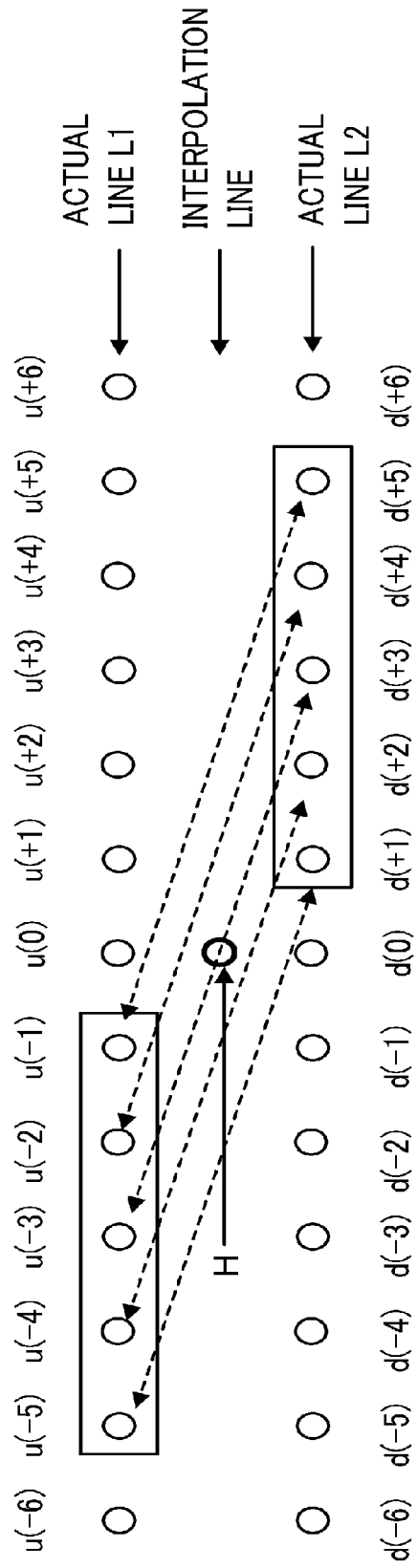
FIG. 6 is a diagram illustrating an example of a process in a block matching unit.

Specifically, the block matching unit 301 calculates an SAD value using values of a predefined number of pixels on an actual line L1 illustrated in FIG. 6, and values of a predefined number of pixels on an actual line L2 that stands at a point-symmetrical position with the interpolation pixel generation position as a center. The actual line L1 is a line that stands one line above the interpolation pixel generation position, and at which N−1 field pixels are present. The actual line L2 is a line that stands one line below the interpolation pixel generation position, and at which N−1 field pixels are present. The interpolation line in the figure is the line at which the interpolation pixel is generated. In the example of FIG. 6, a SAD value is calculated using the values of a total 10 pixels, namely 5 pixels centered about the pixel position for which the SAD value is to be calculated, and 5 pixels positioned at point-symmetrical positions with the foregoing 5 pixels, with the interpolation pixel generation position as a center. As illustrated in FIG. 6, for instance, the SAD value for the position of pixel u(−3) (or pixel d(+3)) is calculated according to the calculation expression below, in a case where the interpolation pixel generation position is H.

$$SAD(u(-3), d(+3)) = |u(-5) - d(+1)| + |u(-4) - d(+2)| +$$
$$|u(-3) - d(+3)| + |u(-2) - d(+4)| + |u(-1) - d(+5)|$$

In the present embodiment, the above-described computation is performed for the pixels u(−10) to u(+10) that are positioned on the actual line L1, and the calculation result (21 SAD values (SAD(u(−10),d(+10)) to SAD(u(+10),d(−10)))) is outputted.

The matching angle calculation unit 302 calculates (postulates) an edge direction at the interpolation pixel generation position, on the basis of the 21 SAD values calculated by the block matching unit 301, and outputs the calculation result as angle information. In the present embodiment, a direction corresponding to a minimum value, from among the abovementioned 21 SAD values, is determined to be an edge direction, and information representing that direction is outputted as angle information.

Figure 7:
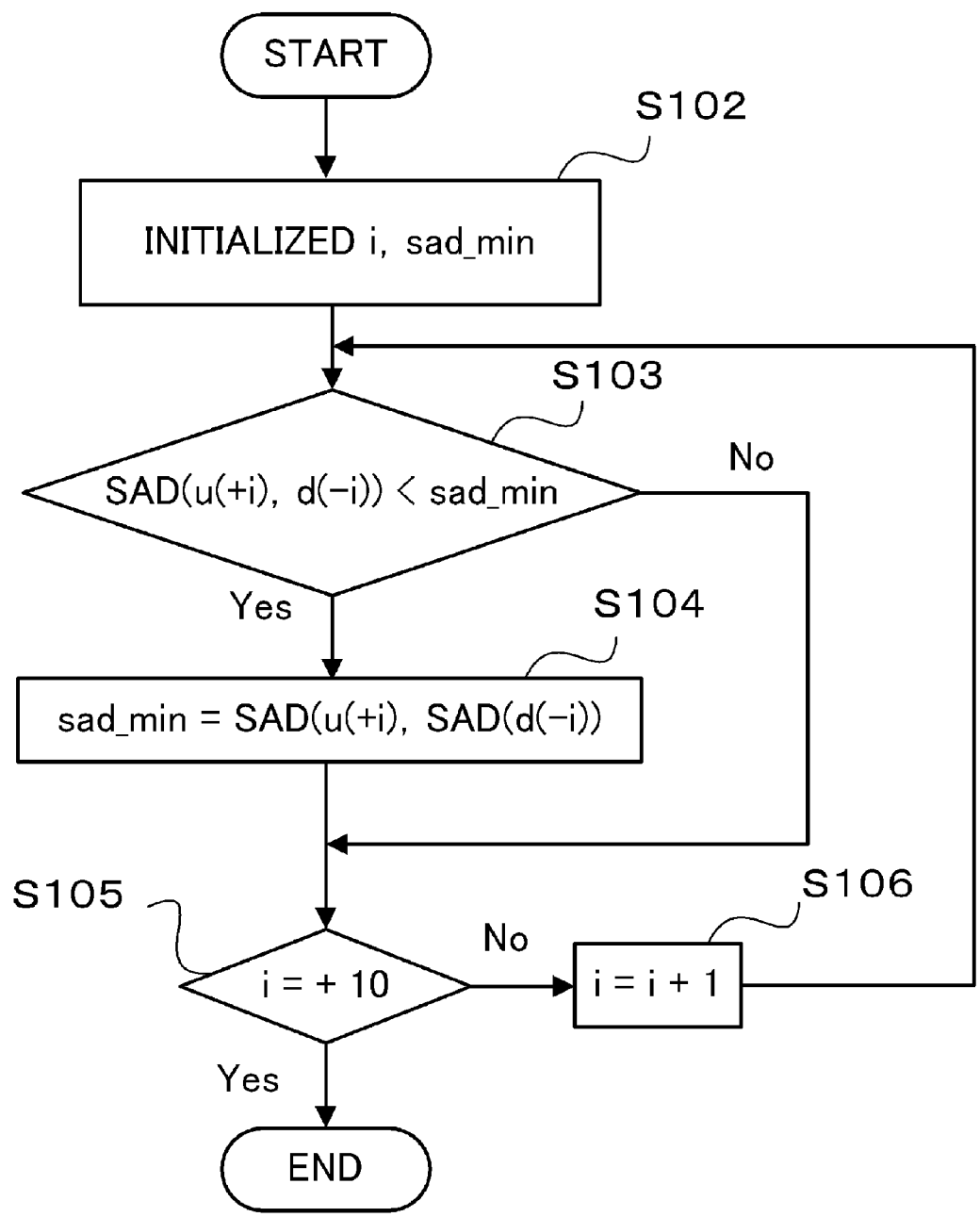
FIG. 7 is a flowchart illustrating an example of a process for calculating a minimum value of SAD values.

FIG. 7 is a flowchart illustrating a process of calculating a minimum value (sad_min) of the SAD values.

Firstly, in S102, i and sad_min are initialized. Herein, i=−9 and sad_min=SAD (u(−10), d(+10)) are set as initial values.

In S103 next, SAD (u(i), d(−i)) and sad_min are compared. Specifically, SAD (u(−9),d(+9)) and SAD (u(−10), d(+10)) are compared first. If SAD (u(i), d(−i)) is smaller than sad_min, the process proceeds to step S104. If SAD (u(i), d(−i)) is equal to or greater than sad_min, the process proceeds to step S105.

In S104, the value of sad_min is replaced by SAD (u(i), d(−i)), and the process proceeds to step S105.

In S105 it is checked whether i=+10. If i=+10, it is determined that comparison of all SAD values (21 SAD values) is complete, and the process of calculating the minimum value of SAD values is over. If i=+10 is not true, it is determined that comparison of all SAD values is not over, the value of i is increased by 1 in S106, and the process returns to S103. That is, the process of S103 and S104 is repeated until i=+10.

The minimum value of the SAD values can be calculated in accordance with the above process.

In the present embodiment, the calculated value of x in the minimum value sad_min=SAD (u(+x), d(−x)) of the SAD values is outputted, as angle information, by the matching angle calculation unit 302.

Figure 8:
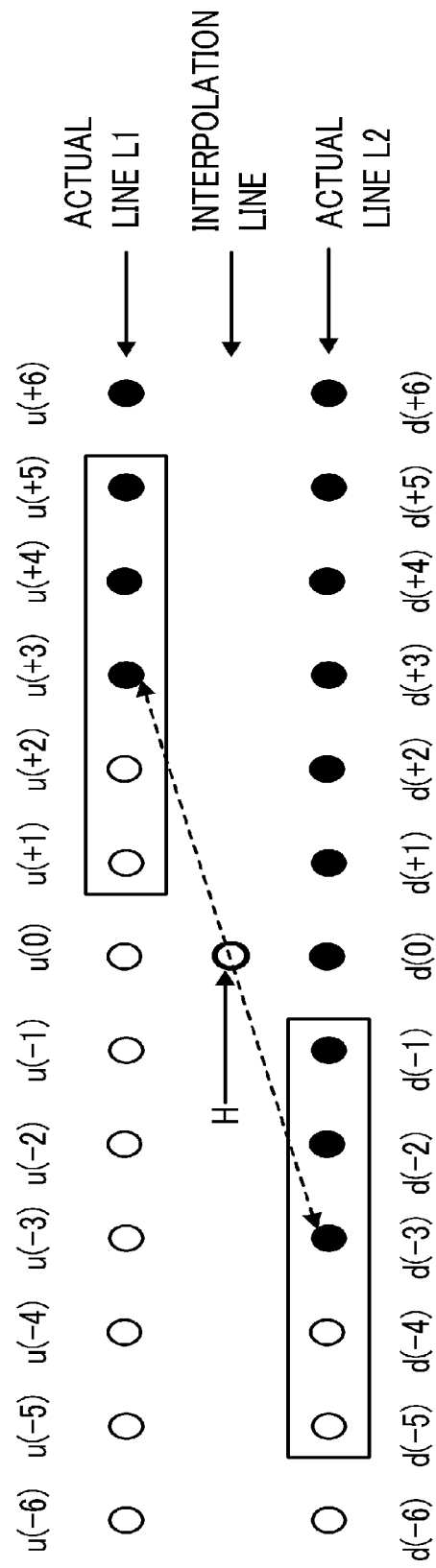
FIG. 8 is a diagram illustrating an example of an image at an oblique edge portion.
Figure 9:
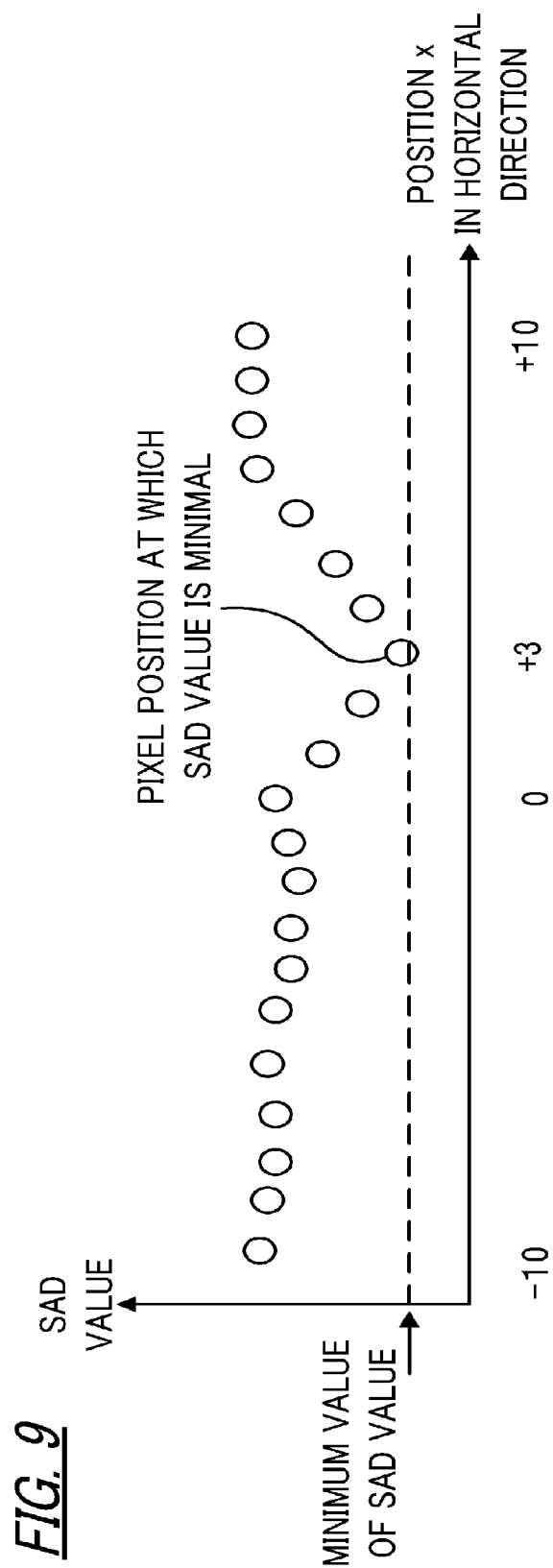
FIG. 9 is a diagram illustrating a distribution of SAD values in the image of FIG. 8.

The distribution of SAD values with respect to the interpolation pixel generation position H is as in FIG. 9, and the SAD value for the position of u(+3) of the actual line L1 takes on a minimum value sad_min, in a case where, for instance, a signal is inputted that represents an image of a pixel configuration such as the one illustrated in FIG. 8 (image of an oblique edge portion). Therefore, +3 is outputted, by the matching angle calculation unit 302, as the angle information.

The oblique edge determination unit 303, which is a characterizing portion of the present invention, determines whether the interpolation pixel generation position is an oblique edge portion on the basis of angle information and on the basis of a signal inputted to the obliqueness detection unit 103 (signal of the field that is to undergo interpolation pixel generation processing). The determination result is outputted to the correction unit 304.

The correction unit 304 corrects the angle information outputted by the matching angle calculation unit 302 in accordance with the determination result by the oblique edge determination unit 303. Specifically, when cancel_flg is 0, the angle information outputted by the matching angle calculation unit 302 is outputted as-is (without correction) to the intra-field interpolation pixel generation unit 104. When cancel_flg is 1, the angle information outputted by the matching angle calculation unit 302 is corrected to 0, and is outputted to the intra-field interpolation pixel generation unit 104. Herein, cancel_flg is a flag that indicates whether interpolation according to the angle information calculated by the matching angle calculation unit 302 is to be performed for the interpolation pixel generation position.

Figure 10:
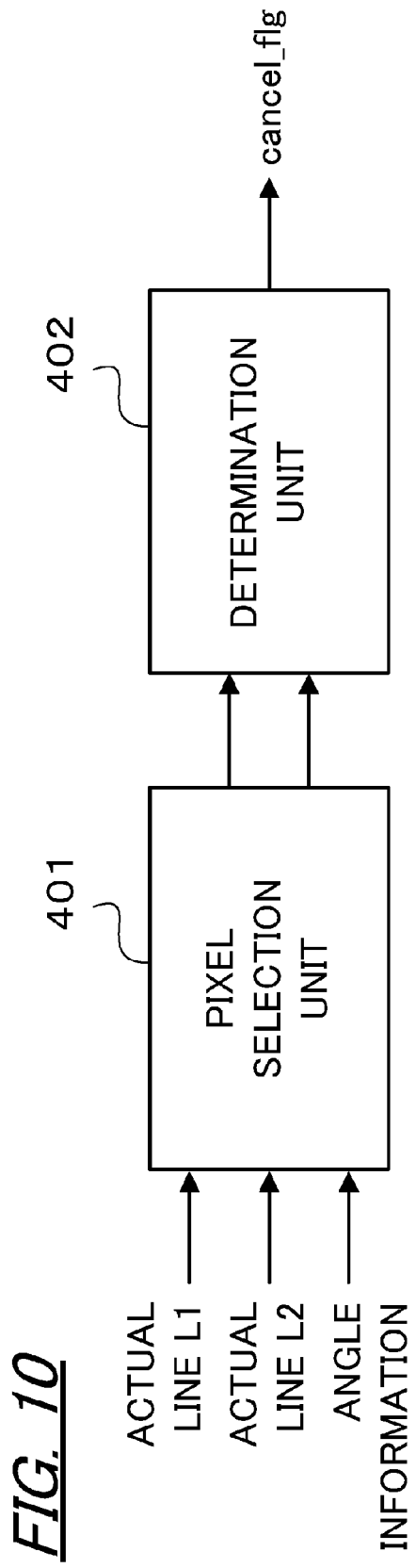
FIG. 10 is a diagram illustrating an example of the configuration of an oblique edge determination unit.

The oblique edge determination unit 303 has a pixel selection unit 401 and a determination unit 402, as illustrated in FIG. 10.

Figure 11:
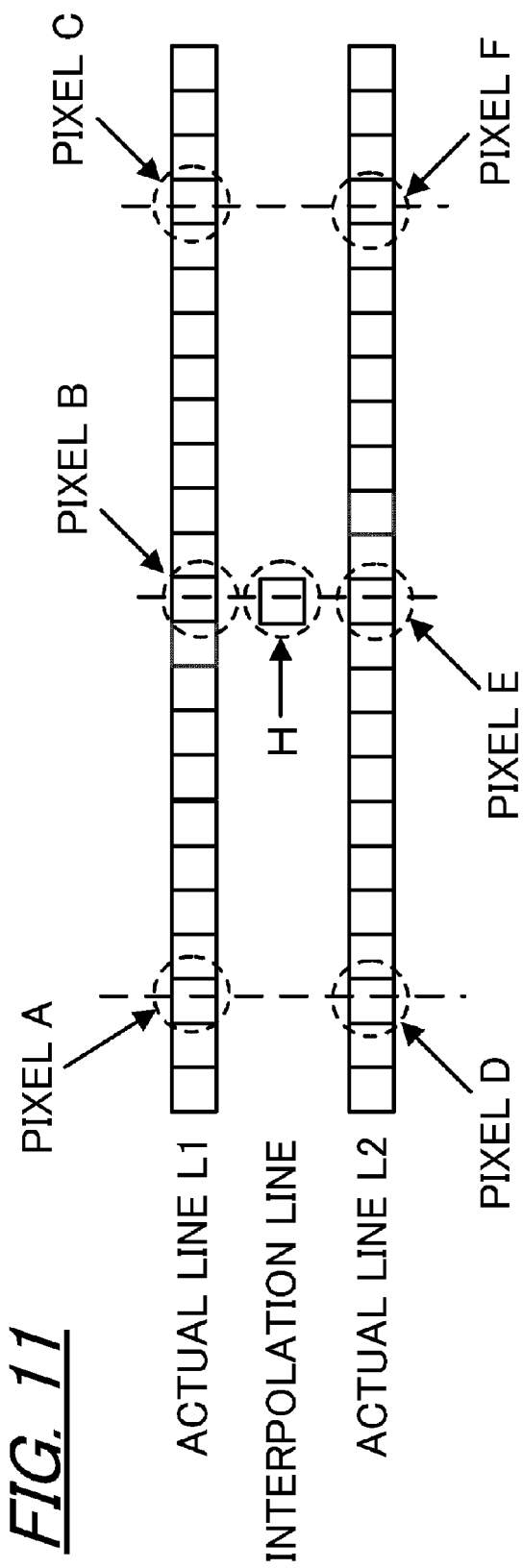
FIG. 11 is a diagram illustrating an example of a pixel selected by a pixel selection unit according to Embodiment 1.

The pixel selection unit 401 selects pixels (pixel A to pixel F in FIG. 11) that are used in the abovementioned determination, from among pixels on the actual line L1 and pixels on the actual line L2, in accordance with the angle information outputted by the matching angle calculation unit 302.

Pixel A to pixel F are as follows:

Pixel A=pixel on the actual line L1, in which the position of the pixel in the horizontal direction is offset from the interpolation pixel generation position, leftward in the horizontal direction, by a number of pixels equal to the absolute value of the angle information;

Pixel B=pixel on the actual line L1, in which the position of the pixel in the horizontal direction is identical to that of the interpolation pixel generation position;

Pixel C=pixel on the actual line L1, in which the position of the pixel in the horizontal direction is offset from the interpolation pixel generation position, rightward in the horizontal direction, by a number of pixels equal to the absolute value of the angle information;

Pixel D=pixel on the actual line L2, in which the position of the pixel in the horizontal direction is offset from the interpolation pixel generation position, leftward in the horizontal direction, by a number of pixels equal to the absolute value of the angle information;

Pixel E=pixel on the actual line L2, in which the position of the pixel in the horizontal direction is identical to that of the interpolation pixel generation position; and Pixel F=pixel on the actual line L2, in which the position of the pixel in the horizontal direction is offset from the interpolation pixel generation position, rightward in the horizontal direction, by a number of pixels equal to the absolute value of the angle information.

Thus the following three types of pixels are selected in the pixel selection unit 401:

pixels on the actual lines L1, L2, in which the position of the pixels in the horizontal direction is identical to that of the interpolation pixel generation position;

pixels that are on the actual lines L1, L2 and that are present in the edge direction as calculated by the matching angle calculation unit 302; and pixels at positions that are point-symmetrical with the abovementioned pixels present in the edge direction, with the interpolation pixel generation position as a center.

The determination unit 402 decides, and outputs, the value of cancel_flg on the basis of the values of pixels selected by the pixel selection unit 401. Specifically, the determination unit 402 determines whether the interpolation pixel generation position is an oblique edge portion, and whether the interpolation pixel generation position is a periodic pattern portion in a horizontal direction, on the basis of the values of the pixels selected by the pixel selection unit 401. The determination unit 402 sets the value of cancel_flg to 1, if the interpolation pixel generation position is an oblique edge portion, and otherwise sets the value of cancel_flg to 0.

Processing in the determination unit 402 is explained next with reference to the flowchart of FIG. 12.

Firstly, in S202, it is determined whether a pixel value one line above or one line below the interpolation pixel generation position decreases locally at a same horizontal position as the interpolation pixel generation position. In other words, it is determined whether a pixel value one line above or one line below the interpolation pixel generation position decreases locally at positions that are adjacent, in the vertical direction, to the interpolation pixel generation position (pixel value determination). In the present embodiment, it is determined whether pixel values at the actual lines L1, L2 decrease locally at a horizontal position identical to the interpolation pixel generation position H (positions adjacent to the generation position H in the vertical direction), on the basis of the values of three points (pixel A to pixel C) on the actual line L1 and values of three points (pixel D to pixel F) on the actual line L2. Specifically, it is determined whether conditional equation 1 below is satisfied or not. Herein, the purpose of a threshold value a is to determine whether the pixel values of two pixels are mutually dissimilar or not on the basis of a difference between the two pixel values.

(value of pixel A−value of pixel B)>threshold value $a$, and (value of pixel C−value of pixel B)>threshold value $a$, and (value of pixel D−value of pixel E)>threshold value $a$, and (value of pixel F−value of pixel E)> threshold value $a$　　　　Conditional equation 1

If conditional equation 1 is satisfied, it is determined that the interpolation pixel generation position is a periodic pattern portion in the horizontal direction (is not an oblique edge portion), and cancel_flg=1 is outputted in order to reset (correction to 0) the angle information in the correction unit 304 (S204). If conditional equation 1 is not satisfied, the process proceeds to step S203.

In S203 it is determined that whether a pixel value one line above or one line below the interpolation pixel generation position increases locally at the same horizontal position as the interpolation pixel generation position (pixel value determination). In other words, it is determined whether a pixel value one line above or one line below the interpolation pixel generation position increases locally at positions that are adjacent, in the vertical direction, to the interpolation pixel generation position. In the present embodiment, it is determined whether pixel values at the actual lines L1, L2 increase locally at a horizontal position identical to the interpolation pixel generation position H, on the basis of the values of three points (pixel A to pixel C) on the actual line L1 and values of three points (pixel D to pixel F) on the actual line L2. Specifically, it is determined whether conditional equation 2 below is satisfied or not.

(value of pixel B−value of pixel A)>threshold value $a$, and (value of pixel B−value of pixel C)>threshold value $a$, and (value of pixel E−value of pixel D)>threshold value $a$, and (value of pixel E−value of pixel F)> threshold value $a$　　　　Conditional equation 2

If conditional equation 2 is satisfied, it is determined that the interpolation pixel generation position is a periodic pattern portion in the horizontal direction (is not an oblique edge portion), and cancel_flg=1 is outputted in order to reset (correction to 0) the angle information in the correction unit 304 (S204). If conditional equation 2 is not satisfied, the process proceeds to step S205.

In the present embodiment, thus, it is determined that the interpolation pixel generation position is not an edge portion in an oblique direction if a pixel value one line above or one line below the interpolation pixel generation position increases or decreases locally at a same horizontal position as the interpolation pixel generation position. In a case where a pixel value one line above or one line below the interpolation pixel generation position increases or decreases locally at a same horizontal position as the interpolation pixel generation position, it is highly likely that the interpolation pixel generation position is a periodic pattern port ion in the horizontal direction. Accordingly, performing the abovementioned determination allows preventing a periodic pattern portion in the horizontal direction from being misdetected as an oblique edge portion.

In S205 it is determined whether a difference (brightness difference) between two pixel values (between the value of pixel B and the value of pixel E) that are adjacent above and below the interpolation pixel generation position H is smaller or not than predefined value. Specifically, it is determined whether conditional equation 3 below is satisfied or not. Herein, the purpose of a threshold value b is to determine whether the two pixel values are mutually dissimilar or not on the basis of the absolute value of the difference between two pixel values.

|value of pixel B− value of pixel E|<threshold value $b$　　　　Conditional equation 3

If conditional equation 3 is satisfied, there is a low likelihood that the interpolation pixel generation position is an oblique edge portion, and hence the process proceeds to step S206. If conditional equation 3 is not satisfied (if the difference between two pixel values adjacent above and below the interpolation pixel generation position is equal to or greater than a predefined value (equal to or greater than a threshold value)), it is determined that the interpolation pixel generation position is an oblique edge portion, and cancel_flg=0 is outputted to the correction unit 304, in order for the angle information that is outputted by the matching angle calculation unit 302 to be selected in the correction unit 304 (S207).

In S206 it is determined whether the signs of the slope (brightness gradient) of change in pixel value in a line direction, for one line above and one line below the interpolation pixel generation position, are identical or not. In the present embodiment, there it is determined whether the signs of the slope of the change in pixel values in the horizontal direction for the actual line L1 and the actual line L2 are dissimilar or not, on the basis of the values at three points (pixel A to pixel C) on the actual line L1, and values at three points (pixel D to pixel F) on the actual line L2. Herein, the feature "dissimilar signs of the slopes" indicates that when pixel values of three points on the actual line L1 change so as to increase toward the right in the image, then the pixel values of the three points on the actual line L2 decrease toward the right of the image, and, conversely, indicates that when pixel values of three points on the actual line L1 change so as to increase toward the left in the image, then the pixel values of the three points on the actual line L2 decrease toward the left of the image. Specifically, it is determined whether conditional equations 4, 5 below are satisfied or not. Herein, the purpose of a threshold value c is to determine whether the pixel values of two pixels are mutually dissimilar or not (whether a brightness gradient is regarded as 0) on the basis of a difference between the two pixel values.

(value of pixel A−value of pixel B)>threshold value $c$, and (value of pixel B−value of pixel C)>threshold value $c$, and (value of pixel E−value of pixel D)>threshold value $c$, and (value of pixel $F$–value of pixel $E$)>
threshold value $c$                                Conditional equation 4

(value of pixel $B$–value of pixel $A$)>threshold value $c$, and (value of pixel $C$–value of pixel $B$)>threshold value $c$, and (value of pixel $D$–value of pixel $E$)>threshold value $c$, and (value of pixel $E$–value of pixel $F$)>
threshold value $c$                                Conditional equation 5

If either conditional equation 4 or conditional equation 5 is satisfied, it is determined that the interpolation pixel generation position is an oblique edge portion (thin line portion having a shallow inclination angle with respect to the horizontal direction), and cancel_flg=0 is outputted to the correction unit 304, in order for angle information that is outputted by the matching angle calculation unit 302 to be selected in the correction unit 304 (S207). If none of conditional equations 4 and 5 is satisfied, it is determined that the interpolation pixel generation position is not an oblique edge portion, and cancel_flg=1 is outputted in order to reset (correction to 0) the angle information in the correction unit 304 (S204).

Within an oblique edge portion, misdetection of the edge direction is likelier in a thin line portion having a shallow inclination angle with respect to horizontal direction (small angle with respect to a horizontal line). The value of the threshold value $c$ is set with such misdetection in mind. The extent to which an inclination angle with respect to the horizontal direction is deemed to be "shallow", and the pixel width in a line such that the line is deemed to be a "thin line", may be appropriately modified in accordance with the specifications of the apparatus. That is, the value of the threshold value $c$ is appropriately modified depending on the specifications of the apparatus.

In the present embodiment, thus, it is determined that the interpolation pixel generation position is not an edge portion in an oblique direction if a difference between two pixel values that are adjacent above and below the interpolation pixel generation position is smaller than a predefined threshold value, and, the signs of the slope of the changes in pixel values in the line direction at one line above and one line below the interpolation pixel generation position are identical. As described above, there is a low likelihood that the interpolation pixel generation position is an oblique edge portion if the difference between two pixel values that are adjacent above and below the interpolation pixel generation position is smaller than a predefined threshold value. The likelihood that the interpolation pixel generation position is an oblique edge portion is yet lower if the signs of the slope of the changes in pixel values in the line direction at one line above and one line below the interpolation pixel generation position are identical. However, the likelihood that the interpolation pixel generation position is a thin line portion having a shallow inclination angle with respect to the horizontal direction is high if the signs of the slope of the pixel values in the line direction at one line above and one line below the interpolation pixel generation position are dissimilar. As a result, performing the abovementioned determination allows reducing misdetection of the edge direction.

Figure 13:
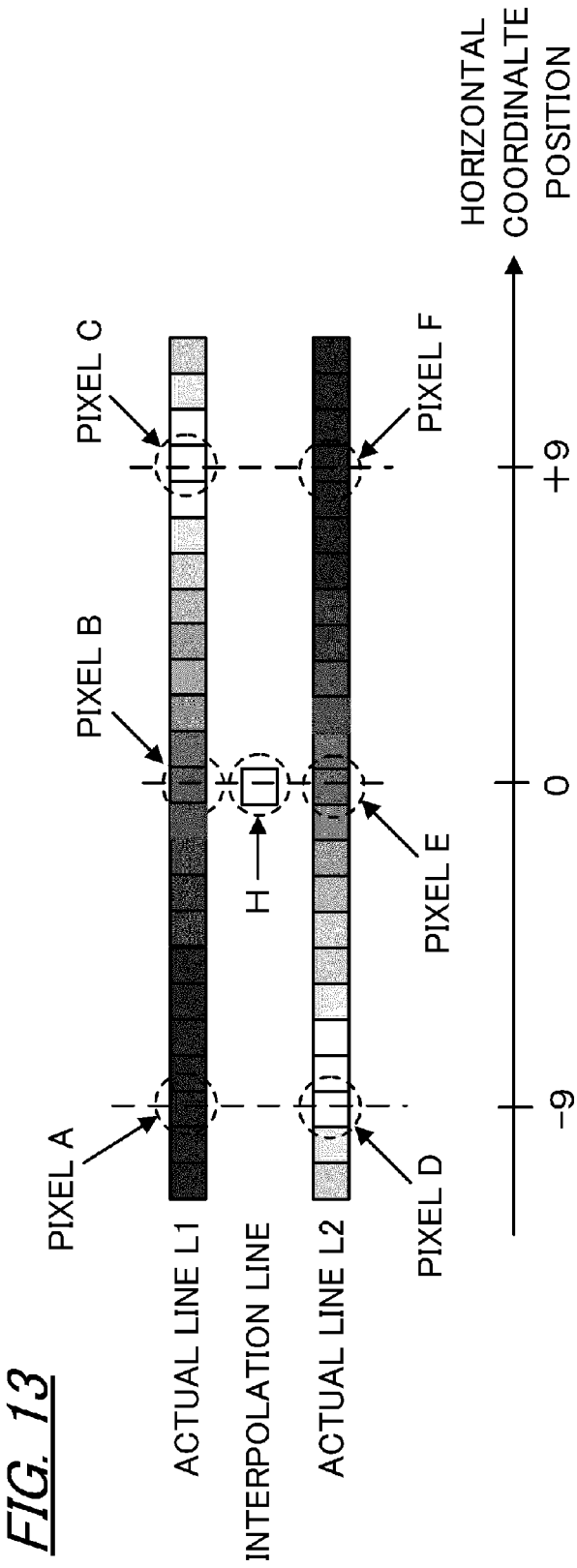
FIG. 13 is a diagram illustrating an example of an image at an oblique edge portion.
Figure 14:
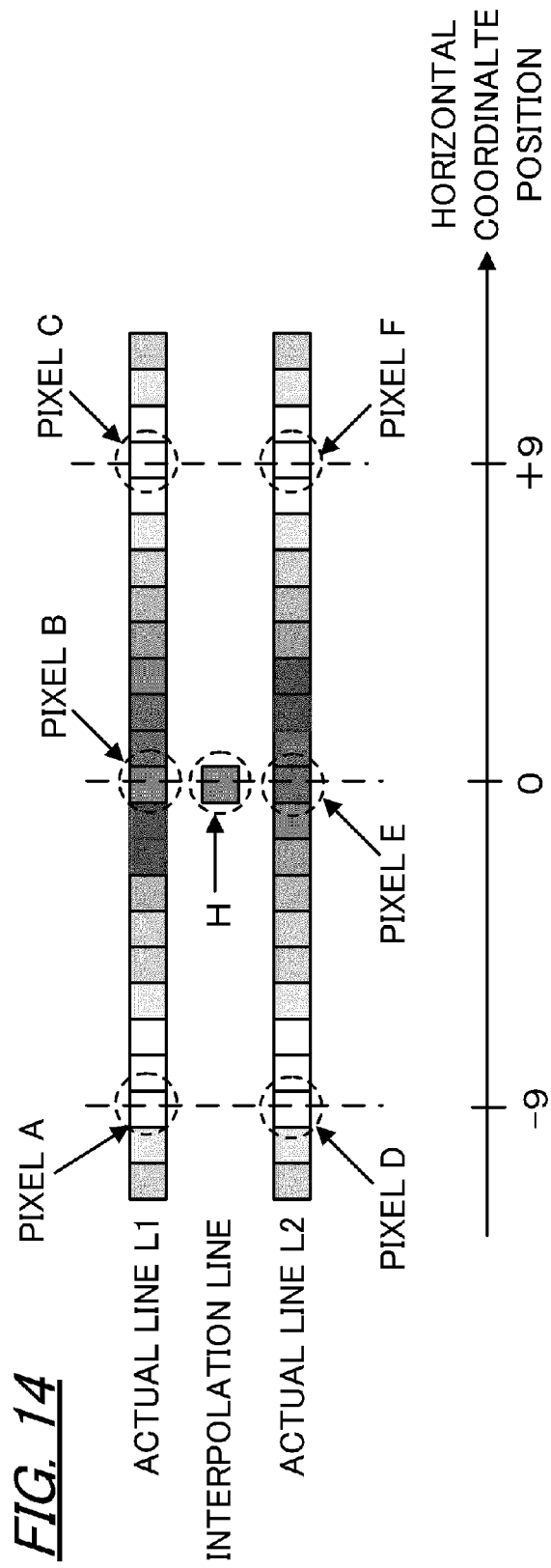
FIG. 14 is a diagram illustrating an example of an image having a periodic pattern portion in a horizontal direction.
Figure 15:
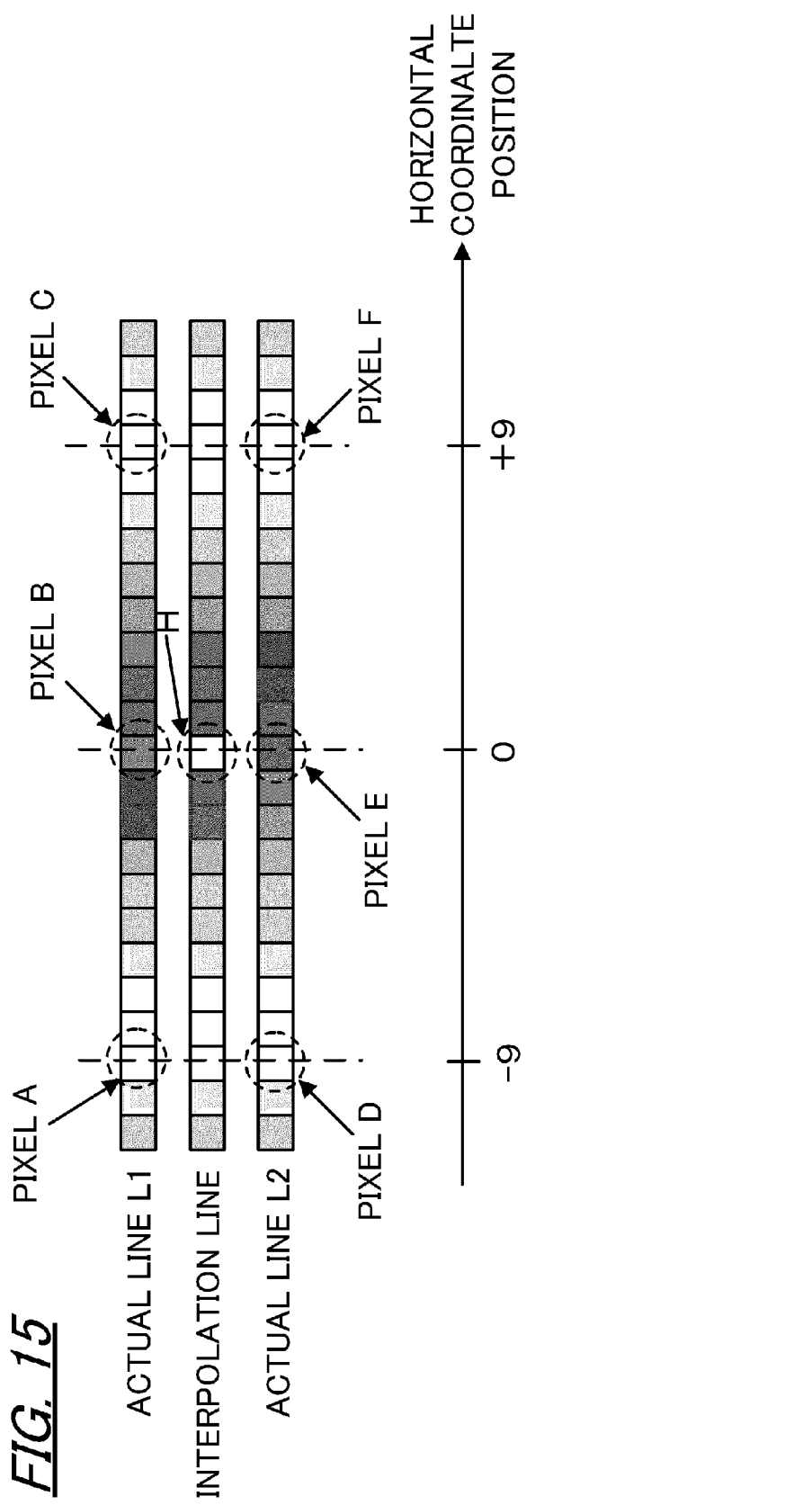
FIG. 15 is a diagram illustrating an example of an interpolation pixel generated in a case of misdetection of an oblique edge portion.

One example of the effect of the present invention is explained next with reference to FIGS. 13 to 15. FIG. 13 illustrates an example of an image of an oblique edge portion (thin line portion having a shallow inclination angle with respect to the horizontal direction). FIG. 14 illustrates an example of an image that is not an oblique edge portion (image of a periodic pattern portion in the horizontal direction).

In the example of FIG. 13, an oblique edge is formed in a direction that joins pixel C and pixel D. Therefore, +9 is outputted, by the matching angle calculation unit 302, as angle information. In the example of FIG. 14, +9 may be outputted, as angle information, by the matching angle calculation unit 302, despite the fact the image is not that of an oblique edge portion.

In the example of FIG. 14, the interpolation pixel generation position H is not an oblique edge portion. Therefore, it is correct to use a mean value of the value of pixel B and the value of pixel E as the pixel value of the interpolation pixel. In the example of FIG. 14, however, there is generated an interpolation pixel using an erroneous detection result of the edge direction, upon generation of the interpolation pixel by relying on the angle information, namely +9, outputted by the matching angle calculation unit 302. That is, a portion that is not an oblique edge portion is misdetected as an oblique edge portion, and there is generated an interpolation pixel of an erroneous pixel value. FIG. 15 illustrates the process of generation of an interpolation pixel for the image of FIG. 14 in a case of misdetected oblique edge portion. When it is determined that an oblique edge is present at a direction that joins pixel C and pixel D, then the mean value of the value of pixel C and the value of pixel D is taken as the pixel value of the interpolation pixel as illustrated in FIG. 15. That is, a bright interpolation pixel is generated between a dark (low brightness value) pixel B and a dark pixel E. This gives rise to significantly impaired image quality.

Figure 12:
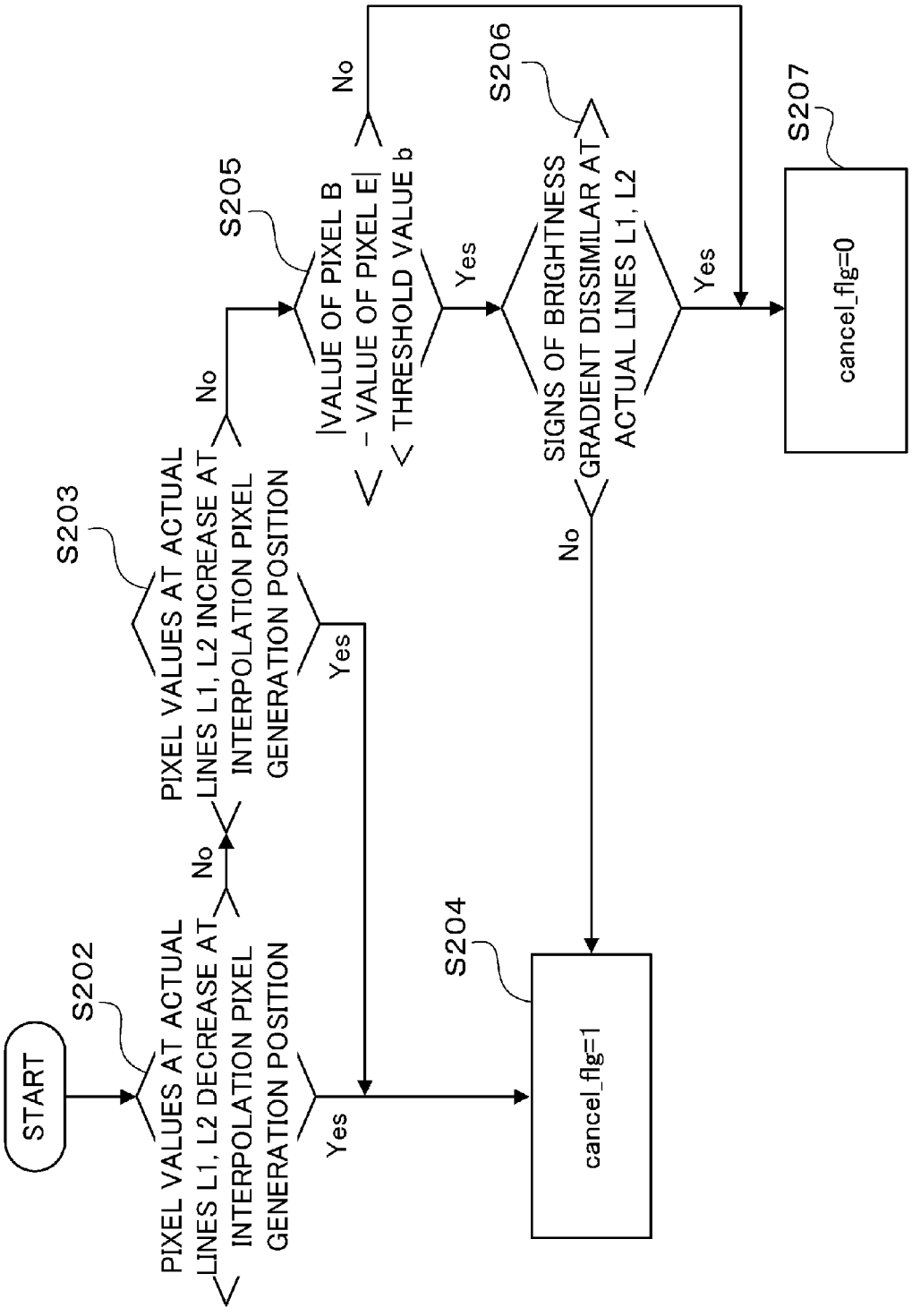
FIG. 12 is a flowchart illustrating an example of a process in a determination unit.

In the example of FIG. 13 in the present embodiment, Yes is determined in S206 of FIG. 12, and there is selected the angle information outputted by the matching angle calculation unit 302. In the example of FIG. 14, Yes is determined in S203 of FIG. 12, and the angle information outputted by the matching angle calculation unit 302 is corrected to 0. The present embodiment, therefore, allows suppressing the above-described impairment of image quality.

In the present embodiment, as described above, it is determined that the interpolation pixel generation position is not an edge portion in an oblique direction if a pixel value one line above or one line below the interpolation pixel generation position increases or decreases locally at a same horizontal position as the interpolation pixel generation position. As a result, it becomes possible to suppress impairment of image quality upon conversion of an interlaced video image signal to a progressive video image signal, by a simple configuration, namely by referring to a pixel value one line above or one line below an interpolation pixel generation position. Specifically, it becomes possible to suppress misdetection of a periodic pattern portion in a horizontal direction as an oblique edge portion.

In the present embodiment, block matching is used as the method for calculating an edge direction, but other methods may be employed, so long as the edge direction can be detected.

In the present embodiment there are compared three pixel values, of a position such that the horizontal direction position one line above or one line below the interpolation pixel generation position is identical to the interpolation pixel generation position, and of two positions based on an edge direction as calculated by the matching angle calculation unit 302, to determine thereby whether the pixel values at this line increases or decreases locally at a horizontal position identical to the interpolation pixel generation position. However, the determination method is not limited thereto. The positions, numbers and so forth of the pixel values that are used may take on other values, so long as it is possible to determine whether a pixel value one line above or one line below the interpolation pixel generation position increases or decreases locally at a horizontal position identical to the interpolation pixel generation position. For instance, so long as the positions in the horizontal direction are two positions that flank a position identical to the interpolation pixel generation position, the positions in the horizontal direction need not be two positions based on an edge direction as calculated by the matching angle calculation unit 302.

Embodiment 2

In Embodiment 1, the interpolation pixel generation position H was determined to be an oblique edge portion or not by using pixels at six points (pixels of three points on the actual line L1 and pixels on three points on the actual line L2), decided in accordance with angle information. In Embodiment 2, the abovementioned determination is performed using more pixels than in Embodiment 1, namely pixels of a total eighteen points, specifically nine points on the actual line L1 and nine points on the actual line L2.

The basic configuration of the obliqueness detection unit 103 according to Embodiment 2 is identical to that of Embodiment 1, and an explanation thereof will be omitted. The operation of the oblique edge determination unit 303 in the present embodiment is different from that of Embodiment 1.

In the present embodiment, specifically, the pixel selection unit 401 selects the following pixels, in addition to the six pixels that are selected in Embodiment 1:

three adjacent pixels (pixels u1 to u3 in FIG. 17) on the actual line L1, leftward, in the horizontal direction, of pixel B having a position, in the horizontal direction, identical to the interpolation pixel generation position;

three adjacent pixels (pixels u4 to u6 in FIG. 17) on the actual line L1, rightward, in the horizontal direction, of pixel B having a position, in the horizontal direction, identical to the interpolation pixel generation position;

three adjacent pixels (pixels d1 to d3 in FIG. 17) on the actual line L2, leftward, in the horizontal direction, of pixel E having a position, in the horizontal direction, identical to the interpolation pixel generation position; and three adjacent pixels (pixels d4 to d6 in FIG. 17) on the actual line L2, rightward, in the horizontal direction, of pixel E having a position, in the horizontal direction, identical to the interpolation pixel generation position.

The determination unit 402 decides, and outputs, the value of cancel_flg on the basis of the values of pixels selected by the pixel selection unit 401.

The process in the determination unit 402 according to the present embodiment will be explained next with reference to FIGS. 16 and 17. The main flow of the process in the determination unit 402 is identical to that of Embodiment 1 (FIG. 12), and hence an explanation thereof will be omitted. In the present embodiment it is determined, in S206, whether the signs of the slope of the pixel values in the line direction one line above and one line below the interpolation pixel generation position are identical or not, using the values of the above-described pixels u1 to u6 and pixels d1 to d6.

Figure 16:
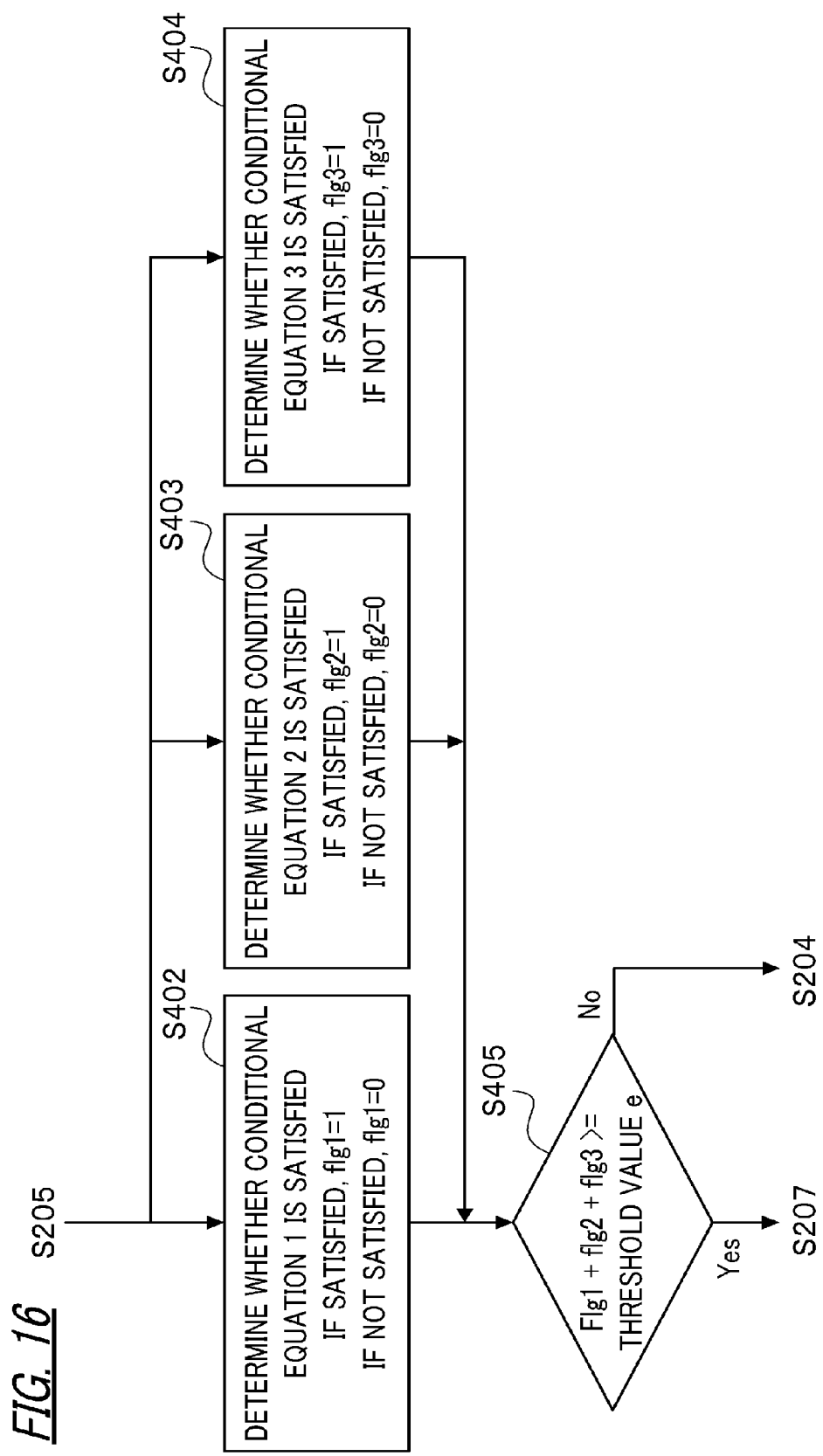
FIG. 16 is a flowchart illustrating an example of the process of S206 in FIG. 12.
Figure 17:
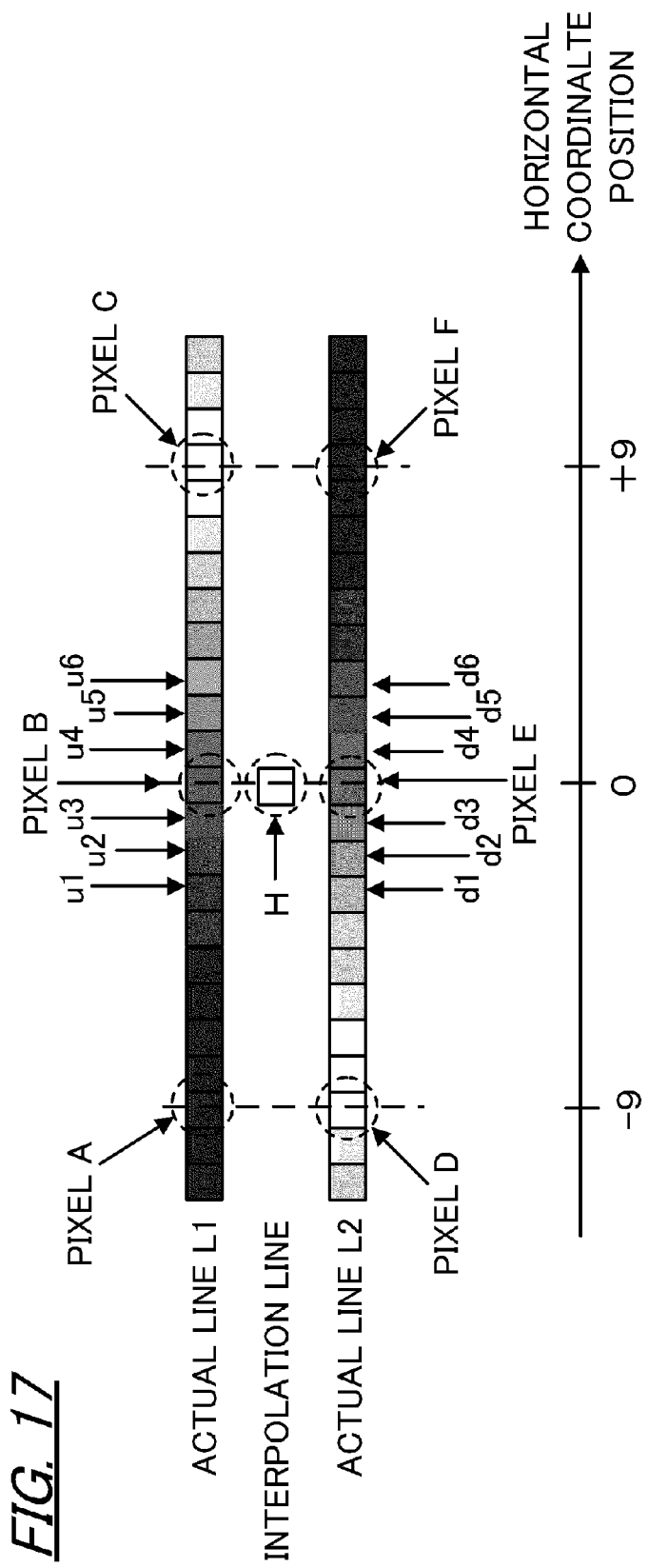
FIG. 17 is a diagram illustrating an example of a pixel selected by a pixel selection unit according to Embodiment 2.

FIG. 16 is a flowchart illustrating in detail the process in S206 in the present embodiment.

Firstly, the process in S402 to 404 is performed simultaneously or sequentially.

In S402, it is determined whether the signs of the brightness gradient represented by pixel u1 and pixel u6, and of brightness gradient represented by pixel d1 and pixel d6, from among the values of pixels u1, u6, d1, d6, are dissimilar or not. Pixels u1, u6 are pixels at positions spaced apart by three pixels, in the horizontal direction, from pixel B. Pixels d1, d6 are pixels at positions spaced apart by three pixels, in the horizontal direction, from pixel E. Specifically, it is determined whether conditional equation 1 below is satisfied or not. Herein, the purpose of a threshold value d is to determine whether the pixel values of two pixels are mutually dissimilar or not (whether a brightness gradient is regarded as 0) on the basis of a difference between the two pixel values. If conditional equation 1 is satisfied, it is determined that the signs of the brightness gradient represented by pixel u1 and pixel u6, and of the brightness gradient represented by pixel d1 and pixel d6, are dissimilar, and there is set flg1=1. If conditional equation 1 is not satisfied, there is set flg1=0.

((value of pixel $u1$–value of pixel $u6$)>threshold value $d$, and (value of pixel $d6$–value of pixel $d1$)>threshold value $d$)

or ((value of pixel $u6$–value of pixel $u1$)>threshold value $d$, and (value of pixel $d1$–value of pixel $d6$)>threshold value $d$)     Conditional equation 1

In S403, it is determined whether the signs of the brightness gradient represented by pixel u2 and pixel u5, and of brightness gradient represented by pixel d2 and pixel d5, from among the values of pixels u2, u5, d2, d5, are dissimilar or not. Pixels u2, u5 are pixels at positions spaced apart by 2 pixels, in the horizontal direction, from pixel B. Pixels d2, d5 are pixels at positions spaced apart by 2 pixels, in the horizontal direction, from pixel E. Specifically, it is determined whether conditional equation 2 below is satisfied or not. If conditional equation 2 is satisfied, it is determined that the signs of the brightness gradient represented by pixel u2 and pixel u5, and of the brightness gradient represented by pixel d2 and pixel d5 are dissimilar, and there is set flg2=1. If conditional equation 2 is not satisfied, there is set flg2=0.

((value of pixel $u2$–value of pixel $u5$)>threshold value $d$, and (value of pixel $d5$–value of pixel $d2$)>threshold value $d$)

or ((value of pixel $u5$–value of pixel $u2$)>threshold value $d$, and (value of pixel $d2$–value of pixel $d5$)>threshold value $d$)     Conditional equation 2

In S404, it is determined whether the signs of the brightness gradient represented by pixel u1 and pixel u4, and of brightness gradient represented by pixel d1 and pixel d4, from among the values of pixels u1, u4, d1, d4, are dissimilar or not. Pixels u1, u4 are pixels at positions spaced apart by 1 pixel, in the horizontal direction, from pixel B. Pixels d1, d4 are pixels at positions spaced apart by 1 pixel, in the horizontal direction, from pixel E. Specifically, it is determined whether conditional equation 3 below is satisfied or not. If conditional equation 3 is satisfied, it is determined that the signs of the brightness gradient represented by pixel u1 and pixel u4, and of the brightness gradient represented by pixel d1 and pixel d4, are dissimilar, and there is set flg3=1. If conditional equation 3 is not satisfied, there is set flg3=0.

((value of pixel $u1$–value of pixel $u4$)>threshold value $d$, and (value of pixel $d4$–value of pixel $d1$)>threshold value $d$)

or ((value of pixel $u4$–value of pixel $u1$)>threshold value $d$, and (value of pixel $d1$–value of pixel $d4$)> threshold value $d$)      Conditional equation 3

In S405 next, the sum total value of flg1 to flg3 calculated in S402 to S404 is compared with a threshold value e, to determine whether the signs of the slope of the pixel values in the line direction at one line above and one line below the interpolation pixel generation position are identical or not. If the signs of the slope of the pixel values in the line direction at one line above and one line below the interpolation pixel generation position are dissimilar, there is a high likelihood that the interpolation pixel generation position H is a thin line portion having a shallow angle. Accordingly, the likelihood that the interpolation pixel generation position H is a thin line portion having a shallow angle is highest if the sum total value of flg1 to flg3 is 3, and the likelihood that the interpolation pixel generation position H is a thin line portion having a shallow angle is lowest if the sum total value of flg1 to flg3 is 0. In S405, therefore, it is determined that the interpolation pixel generation position is a thin line portion having a shallow angle if the sum total value of flg1 to flg3 is equal to or greater than the threshold value e, and cancel_flg=0 is outputted to the correction unit 304, in order for angle information that is outputted by the matching angle calculation unit 302 to be selected in the correction unit 304 (S207). If the sum total value of flg1 to flg3 is smaller than the threshold value e, it is determined that the interpolation pixel generation position is not an oblique edge portion, and cancel_flg=1 is outputted in order to reset (correction to 0) the angle information in the correction unit 304 (S204). The value of the threshold value e may be set to a value ranging from 0 to 3, depending on the intended purpose.

As described above, in the present embodiment it is determined whether the signs of the slope of the pixel values in the line direction at one line above and one line below the interpolation pixel generation position are dissimilar or not, by using more pixels than in Embodiment 1. This allows further reducing misdetection wherein a thin line portion having a shallow angle is deemed not to be an oblique edge portion.

Embodiment 3

In Embodiment 1, the interpolation pixel generation position H was determined to be an oblique edge portion or not by using pixels at six points decided in accordance with angle information. In Embodiment 3, the abovementioned determination is performed using more pixels than in Embodiment 1, namely pixels of a total ten points, specifically five points on the actual line L1 and five points on the actual line L2.

The basic configuration of the obliqueness detection unit 103 according to Embodiment 3 is identical to that of Embodiment 1, and an explanation thereof will be omitted.

The operation of the oblique edge determination unit 303 in the present embodiment is identical to that of Embodiment 1.

Figure 18:
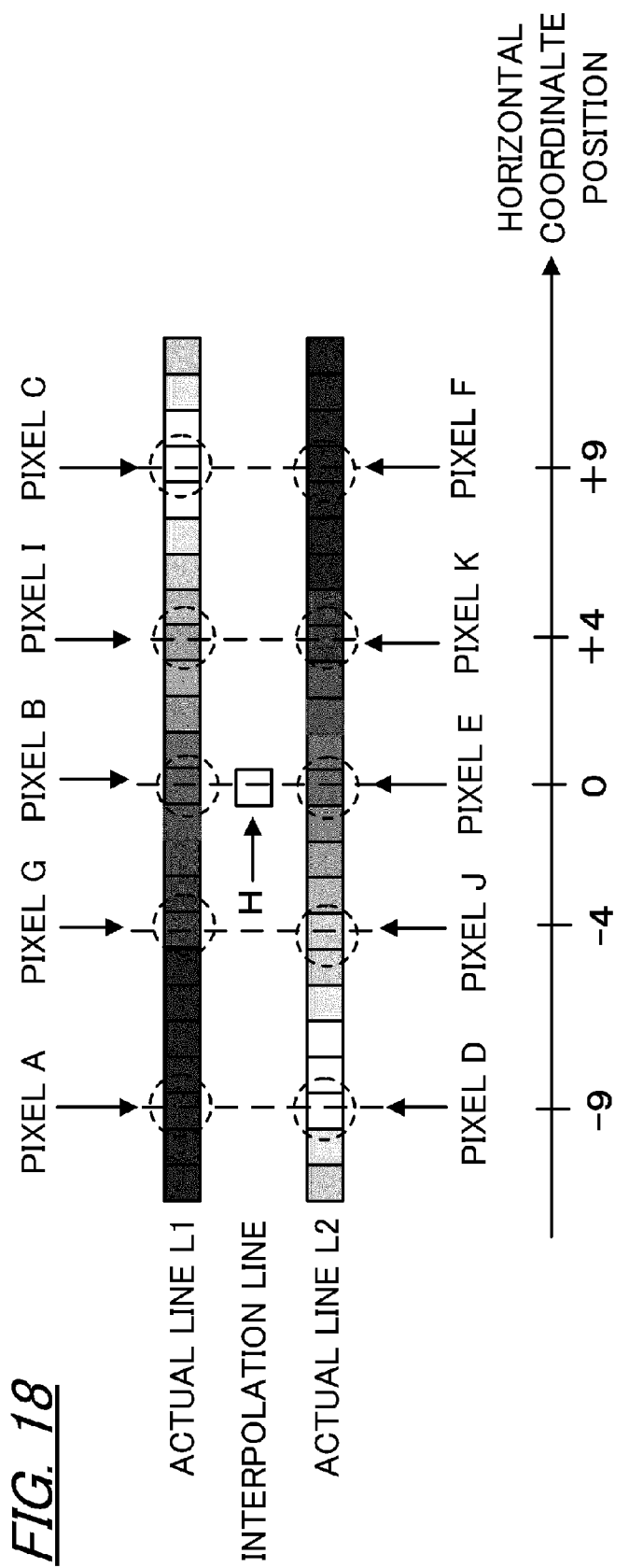
FIG. 18 is a diagram illustrating an example of a pixel selected by a pixel selection unit according to Embodiment 3.

In the present embodiment, specifically, the pixel selection unit 401 selects the following pixels, in addition to the six pixels that are selected in Embodiment 1:

pixel on the actual line L1, such that the position of the pixel in the horizontal direction is offset from the interpolation pixel generation position, leftward in the horizontal direction, by ½ the number of pixels equal to the absolute value of the angle information (i.e. pixel positioned between pixel A and pixel B: pixel G in FIG. 18);

pixel on the actual line L1, such that the position of the pixel in the horizontal direction is offset from the interpolation pixel generation position, rightward in the horizontal direction, by ½ the number of pixels equal to the absolute value of the angle information (i.e. pixel positioned between pixel B and pixel C: pixel I in FIG. 18);

pixel on the actual line L2, such that the position of the pixel in the horizontal direction is offset from the interpolation pixel generation position, leftward in the horizontal direction, by ½ the number of pixels equal to the absolute value of the angle information (i.e. pixel positioned between pixel D and pixel E: pixel J in FIG. 18); and pixel on the actual line L2, such that the position of the pixel in the horizontal direction is offset from the interpolation pixel generation position, rightward in the horizontal direction, by ½ the number of pixels equal to the absolute value of the angle information (i.e. pixel positioned between pixel E and pixel F: pixel K in FIG. 18).

The determination unit 402 decides, and outputs, the value of cancel_flg on the basis of the values of pixels selected by the pixel selection unit 401.

The process in the determination unit 402 according to the present embodiment will be explained next with reference to FIG. 12.

Firstly, in S202, it is determined whether the pixel values for the actual lines L1, L2 decrease locally at a horizontal position identical to the interpolation pixel generation position H, on the basis of the values of pixels A to K. Specifically, it is determined whether conditional equations 1, 2 below are satisfied or not. Herein, the purpose of a threshold value f is to determine whether the pixel values of two pixels are mutually dissimilar or not on the basis of a difference between the two pixel values.

((value of pixel $A$–value of pixel $B$)>threshold value $f$, and (value of pixel $C$–value of pixel $B$)>threshold value $f$, and (value of pixel $G$–value of pixel $B$)>threshold value $f$, and (value of pixel $I$–value of pixel $B$)> threshold value $f$)      Conditional equation 1

((value of pixel $D$–value of pixel $E$)>threshold value $f$, and (value of pixel $F$–value of pixel $E$)>threshold value $f$, and (value of pixel $J$–value of pixel $E$)>threshold value $f$, and (value of pixel $K$–value of pixel $E$)> threshold value $f$)      Conditional equation 2

If conditional equations 1, 2 are satisfied, it is determined that the interpolation pixel generation position is a periodic pattern portion in the horizontal direction (is not an oblique edge portion), and cancel_flg=1 is outputted in order to reset (correction to 0) the angle information in the correction unit 304 (S204). If either conditional equation 1 or 2 is not satisfied, the process proceeds to step S203.

In S203 it is determined whether the pixel values for the actual lines L1, L2 increase locally at a horizontal position identical to the interpolation pixel generation position H, on the basis of the values of pixels A to K. Specifically, it is determined whether conditional equations 3, 4 below are satisfied or not.

((value of pixel $B$–value of pixel $A$)>threshold value $f$, and (value of pixel $B$–value of pixel $C$)>threshold value $f$, and (value of pixel $B$–value of pixel $G$)>threshold value $f$, and (value of pixel $B$–value of pixel $I$)>threshold value $f$)    Conditional equation 3

((value of pixel $E$–value of pixel $D$)>threshold value $f$, and (value of pixel $E$–value of pixel $F$)>threshold value $f$, and (value of pixel $E$–value of pixel $J$)>threshold value $f$, and (value of pixel $E$–value of pixel $K$)>threshold value $f$)    Conditional equation 4

If both conditional equations 3, 4 are satisfied, it is determined that the interpolation pixel generation position is a periodic pattern portion in the horizontal direction (is not an oblique edge portion), and cancel_flg=1 is outputted in order to reset (correction to 0) the angle information in the correction unit 304 (S204). If either conditional equation 3 or 4 is not satisfied, the process proceeds to step S205.

In S205 it is determined, in the same way as in S205 of Embodiment 1, whether a difference (brightness difference) between two pixel values (between the value of pixel B and the value of pixel E) that are adjacent above and below the interpolation pixel generation position H is smaller or not than a predetermined value. Specifically, it is determined whether conditional equation 5 below is satisfied or not.

|value of pixel $B$–value of pixel $E$|<threshold value $b$    Conditional equation 5

If conditional equation 5 is satisfied, there is a low likelihood that the interpolation pixel generation position is an oblique edge portion, and hence the process proceeds to step S206. If conditional equation 5 is not satisfied, it is determined that the interpolation pixel generation position is an oblique edge portion, and cancel_flg=0 is outputted to the correction unit 304, in order for the angle information that is outputted by the matching angle calculation unit 302 to be selected in the correction unit 304 (S207).

In S206 it is determined whether the signs of the slope of the pixel values in the horizontal direction at the actual line L1 and the actual line L2 are dissimilar or not, based on the values of pixels A to K. Specifically, it is determined whether conditional equations 6,7 below are satisfied or not. Herein, the purpose of a threshold value g is to determine whether the pixel values of two pixels are mutually dissimilar or not (whether a brightness gradient is regarded as 0) on the basis of a difference between the two pixel values.

((value of pixel $A$–value of pixel $B$)>threshold value $g$, and (value of pixel $B$–value of pixel $C$)>threshold value $g$, and (value of pixel $F$–value of pixel $E$)>threshold value $g$, and (value of pixel $E$–value of pixel $D$)>threshold value $g$, and (value of pixel $G$–value of pixel $B$)>threshold value $g$, and (value of pixel $B$–value of pixel $I$)>threshold value $g$, and (value of pixel $K$–value of pixel $E$)>threshold value $g$, and (value of pixel $E$–value of pixel $J$)>threshold value $g$)    Conditional equation 6

((value of pixel $C$–value of pixel $B$)>threshold value $g$, and (value of pixel $B$–value of pixel $A$)>threshold value $g$, and (value of pixel $D$–value of pixel $E$)>threshold value $g$, and (value of pixel $E$–value of pixel $F$)>threshold value $g$, and (value of pixel $I$–value of pixel $B$)>threshold value $g$, and (value of pixel $B$–value of pixel $G$)>threshold value $g$, and (value of pixel $J$–value of pixel $E$)>threshold value $g$, and (value of pixel $E$–value of pixel $K$)>threshold value $g$)    Conditional equation 7

If either conditional equation 6 or conditional equation 7 is satisfied, it is determined that the interpolation pixel generation position is an oblique edge portion (thin line portion having a shallow inclination angle with respect to the horizontal direction), and cancel_flg=0 is outputted to the correction unit 304, in order for the angle information that is outputted by the matching angle calculation unit 302 to be selected in the correction unit 304 (S207). If none of conditional equations 6 and 7 is satisfied, it is determined that the interpolation pixel generation position is not an oblique edge portion, and cancel_flg=1 is outputted in order to reset (correction to 0) the angle information in the correction unit 304 (S204).

In the present embodiment, as described above, it is determined whether pixel values in the actual lines L1, L2 decrease locally or not at a horizontal position identical to the interpolation pixel generation position H, by using more pixels than in Embodiment 1. As a result, this allows further reducing misdetection of a periodic pattern portion, in the horizontal direction, as an oblique edge portion, and misdetection of an oblique edge portion as a periodic pattern in the horizontal direction. In the present embodiment it is determined whether the signs of the slope of the pixel values in the line direction at one line above and one line below the interpolation pixel generation position are identical or not, by using more pixels than in Embodiment 1. This allows further reducing misdetection wherein a thin line portion having a shallow angle is deemed not to be an oblique edge portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-066216, filed on Mar. 24, 2011, and Japanese Patent Application No. 2012-012004, filed on Jan. 24, 2012, which are hereby incorporated by reference herein in their entirety.

What is claimed is:

1. A video image processing apparatus that converts an interlaced video image signal to a progressive video image signal, by interpolation,
the video image processing apparatus comprising:
a determination unit that determines whether an interpolation pixel generation position is an edge portion in an oblique direction, and when the interpolation pixel generation position is an edge portion in an oblique direction, determines a direction of the edge; and
a generation unit that generates an interpolation pixel by interlaced-to-progressive conversion, this generation unit being unit that generates an interpolation pixel at an interpolation pixel generation position which has been determined, by the determination unit, to be an edge portion in an oblique direction, in use of a pixel that is present in the edge direction, wherein
the determination unit determines whether the interpolation pixel generation position is an edge portion in an oblique direction on the basis of signs of slopes of changes in the pixel values in a horizontal direction at one line above and one line below the interpolation pixel generation position when pixel values one line above and one line below the interpolation pixel generation position neither increase nor decrease locally at positions that are adjacent, in the vertical direction, to the interpolation pixel generation position, and a difference between two pixel values adjacent above and below the interpolation pixel generation position is smaller than a predefined threshold value.

2. The video image processing apparatus according to claim 1,
wherein the determination unit determines that the interpolation pixel generation position is not an edge portion in an oblique direction when pixel values one line above and one line below the interpolation pixel generation position increase or decrease locally at positions that are adjacent, in the vertical direction, to the interpolation pixel generation position.

3. The video image processing apparatus according to claim 1,
wherein the determination unit determines that the interpolation pixel generation position is an edge portion in an oblique direction when pixel values one line above and one line below the interpolation pixel generation position neither increase nor decrease locally at positions that are adjacent, in the vertical direction, to the interpolation pixel generation position, and a difference between two pixel values adjacent above and below the interpolation pixel generation position is equal to or greater than a predefined threshold value.

4. The video image processing apparatus according to claim 1,
wherein the determination unit determines that the interpolation pixel generation position is not an edge portion in an oblique direction when pixel values one line above and one line below the interpolation pixel generation position neither increase nor decrease locally at positions that are adjacent, in the vertical direction, to the interpolation pixel generation position, a difference between two pixel values adjacent above and below the interpolation pixel generation position is smaller than a predefined threshold value, and signs of a slope of a change in the pixel values in a horizontal direction at one line above and one line below the interpolation pixel generation position are identical.

5. The video image processing apparatus according to claim 1,
wherein the determination unit determines that the interpolation pixel generation position is an edge portion in an oblique direction when pixel values one line above and one line below the interpolation pixel generation position neither increase nor decrease locally at positions that are adjacent, in the vertical direction, to the interpolation pixel generation position, a difference between two pixel values adjacent above and below the interpolation pixel generation position is smaller than a predefined threshold value, and signs of a slope of a change in the pixel values in a horizontal direction at one line above and one line below the interpolation pixel generation position are dissimilar.

6. The video image processing apparatus according to claim 1,
wherein the determination unit determines whether the interpolation pixel generation position is an edge portion in an oblique direction, by comparing the pixel values one line above and one line below the interpolation pixel generation position, the pixel values being the pixel values at a plurality of positions that include positions that are adjacent, in the vertical direction, to the interpolation pixel generation position, and two positions that flank the adjacent position.

7. The video image processing apparatus according to claim 6,
wherein the determination unit has
a block matching unit that performs block matching by comparing a block formed of a predefined number of pixels one line above the interpolation pixel generation position, and a block formed of the predefined number of pixels one line below the interpolation pixel generation position, and postulates an edge direction at the interpolation pixel generation position on the basis of a result of the block matching; and
a pixel value determination unit that compares the pixel values one line above and one line below the interpolation pixel generation position, the pixel values being the pixel values at a plurality of positions that include positions that are adjacent, in the vertical direction, to the interpolation pixel generation position, positions that are present in the edge direction postulated from the interpolation pixel generation position, and a positions that are point-symmetrical with the positions that is are present in the postulated edge direction with respect to the position that is adjacent, in the vertical direction, to the interpolation pixel generation position as a center of symmetry, and determines whether the pixel values in those lines increase or decrease locally at positions that are adjacent, in the vertical direction, to the interpolation pixel generation position.

8. A video image processing method that is carried out in a video image processing apparatus that converts an interlaced video image signal to a progressive video image signal by interpolation, the video image processing method comprising:

a determination step of determining whether an interpolation pixel generation position is an edge portion in an oblique direction, and determining the edge direction when the interpolation pixel generation position is an edge portion in an oblique direction; and a generation step of generating an interpolation pixel by interlaced-to-progressive conversion, this generation step being a step of generating an interpolation pixel at an interpolation pixel generation position which has been determined, in the determination step, to be an edge portion in an oblique direction, in use of a pixel that is present in the edge direction, wherein in the determination step determination is made on whether the interpolation pixel generation position is an edge portion in an oblique direction on the basis of signs of slopes of changes in the pixel values in a horizontal direction at one line above and one line below the interpolation pixel generation position when pixel values one line above and one line below the interpolation pixel generation position neither increase nor decrease locally at positions that are adjacent, in a vertical direction, to the interpolation pixel generation position, and a difference between two pixel values adjacent above and below the interpolation pixel generation position is smaller than a predefined threshold value.

9. The video image processing method according to claim 8, wherein in the determination step determination is made that the interpolation pixel generation position is not an edge portion in an oblique direction when pixel values one line above and one line below the interpolation pixel generation position increase or decrease locally at positions that are adjacent, in the vertical direction, to the interpolation pixel generation position.

10. The video image processing method according to claim 8, wherein in the determination step determination is made that the interpolation pixel generation position is an edge portion in an oblique direction when pixel values one line above and one line below the interpolation pixel generation position neither increase nor decrease locally at positions that are adjacent, in the vertical direction, to the interpolation pixel generation position, and a difference between two pixel values adjacent above and below the interpolation pixel generation position is equal to or greater than a predefined threshold value.

11. The video image processing method according to claim 8, wherein in the determination step determination is made that the interpolation pixel generation position is not an edge portion in an oblique direction when pixel values one line above and one line below the interpolation pixel generation position neither increase nor decrease locally at positions that are adjacent, in the vertical direction, to the interpolation pixel generation position, a difference between two pixel values adjacent above and below the interpolation pixel generation position is smaller than a predefined threshold value, and signs of a slope of a change in the pixel values in a horizontal direction at one line above and one line below the interpolation pixel generation position are identical.

12. The video image processing method according to claim 8, wherein in the determination step determination is made that the interpolation pixel generation position is an edge portion in an oblique direction when pixel values one line above and one line below the interpolation pixel generation position neither increase nor decrease locally at positions that are adjacent, in the vertical direction, to the interpolation pixel generation position, a difference between two pixel values adjacent above and below the interpolation pixel generation position is smaller than a predefined threshold value, and signs of a slope of a change in the pixel values in a horizontal direction at one line above and one line below the interpolation pixel generation position are dissimilar.

13. The video image processing method according to claim 8, wherein in the determination step determination is made on whether the interpolation pixel generation position is an edge portion in an oblique direction, by comparing the pixel values one line above and one line below the interpolation pixel generation position, the pixel values being the pixel values at a plurality of positions that include positions that are adjacent, in the vertical direction, to the interpolation pixel generation position, and two positions that flank the adjacent position.

14. The video image processing method according to claim 13, wherein the determination step includes a block matching step of performing block matching by comparing a block formed of a predefined number of pixels one line above the interpolation pixel generation position, and a block formed of the predefined number of pixels one line below the interpolation pixel generation position, and postulating an edge direction at the interpolation pixel generation position on the basis of a result of the block matching; and a pixel value determination step of comparing the pixel values one line above and one line below the interpolation pixel generation position, the pixel values being the pixel values at a plurality of positions that include positions that are adjacent, in the vertical direction, to the interpolation pixel generation position, positions that are present in the edge direction postulated from the interpolation pixel generation position, and positions that are point-symmetrical with the positions that are present in the postulated edge direction with respect to the position that is adjacent, in the vertical direction, to the interpolation pixel generation position as a center of symmetry, and determining whether the pixel values in those lines increase or decrease locally at positions that are adjacent, in the vertical direction, to the interpolation pixel generation position.

15. The video image processing apparatus according to claim 6, wherein, the determination unit determines whether the interpolation pixel generation position is an edge portion in an oblique direction, by comparing the pixel values one line above and one line below the interpolation pixel generation position, the pixel values being the pixel values at a plurality of positions that include positions that are adjacent, in the vertical direction, to the interpolation pixel generation position, the Nth positions (N is an integer number) that are present in rightward direction from the positions that are adjacent, in the vertical direction, to the interpolation pixel generation position, and the Nth positions that are present in leftward direction from the positions that are adjacent, in the vertical direction, to the interpolation pixel generation position.

16. The video image processing method according to claim 13,
wherein in the determination step determination is made on whether the interpolation pixel generation position is an edge portion in an oblique direction, by comparing the pixel values one line above and one line below the interpolation pixel generation position, the pixel values being the pixel values at a plurality of positions that include positions that are adjacent, in the vertical direction, to the interpolation pixel generation position, the Nth positions (N is an integer number) that are present in rightward direction from the positions that are adjacent, in the vertical direction, to the interpolation pixel generation position, and the Nth positions that are present in leftward direction from the positions that are adjacent, in the vertical direction, to the interpolation pixel generation position.

* * * * *